(12) United States Patent
Balass

(10) Patent No.: US 9,956,501 B2
(45) Date of Patent: May 1, 2018

(54) DISTILLATION APPARATUS FOR EXTRACTION OF ESSENTIAL OILS AND HYDROSOLS FROM PLANT MATTER WITHIN A CAPSULE

(71) Applicant: Moshe Balass, Bet Arie Offarim (IL)

(72) Inventor: Moshe Balass, Bet Arie Offarim (IL)

(73) Assignee: AROMATOR LLC, Edison, NJ (US)

( * ) Notice: Subject to any disclaimer, the term of this patent is extended or adjusted under 35 U.S.C. 154(b) by 1264 days.

(21) Appl. No.: 13/923,047

(22) Filed: Jun. 20, 2013

(65) Prior Publication Data
US 2014/0001027 A1    Jan. 2, 2014

Related U.S. Application Data

(60) Provisional application No. 61/662,408, filed on Jun. 21, 2012.

(51) Int. Cl.
*C11B 9/00*      (2006.01)
*B01D 11/02*    (2006.01)
(Continued)

(52) U.S. Cl.
CPC ............ *B01D 3/38* (2013.01); *B01D 11/0215* (2013.01); *B01D 11/0219* (2013.01);
(Continued)

(58) Field of Classification Search
CPC ............ B01D 2011/007; B01D 11/02; B01D 11/0219; B01D 11/0203; B01D 11/0207;
(Continued)

(56) References Cited

U.S. PATENT DOCUMENTS 4,022,694 A * 5/1977 Fruman .............. B01D 17/0202
                                                              210/350
4,257,945 A      3/1981 Martel
(Continued)

FOREIGN PATENT DOCUMENTS

CN          201223738          4/2009
CN          201353436          12/2009
(Continued)

OTHER PUBLICATIONS

J-PlatPat Translation of JP 3,131,339 U.*
(Continued)

*Primary Examiner* — Jonathan Miller
*Assistant Examiner* — Jonathan Luke Pilcher
(74) *Attorney, Agent, or Firm* — Leason Ellis LLP

(57) ABSTRACT

The present invention is directed to a modular distillation system incorporating a removable capsule for containing source material for extraction. Through the action of the invention, the steam distillation process described herein produces a substantially larger amount of volatile oil than a distillation system that does not use an enclosed, modular system. The present invention provides for an apparatus that allows for greater contact between the steam and plant matter during the distillation process through the use of a closed removable capsule containing relatively small amount of plant matter. Additionally, the present invention is directed to a system that allows the generation of higher quality distillate and considerably higher quantity of volatile oil extracts by forcing the steam to evenly disperse through a removable capsule, and by preventing the condensed liquid to return back to the boiling water within the vessel.

26 Claims, 27 Drawing Sheets

(51) Int. Cl.
*B01D 3/38* (2006.01)
*B01D 11/00* (2006.01)
*C11B 9/02* (2006.01)

(52) U.S. Cl.
CPC .... *B01D 11/0296* (2013.01); *B01D 2011/007* (2013.01); *C11B 9/025* (2013.01)

(58) Field of Classification Search
CPC ............ B01D 11/0215; B01D 11/0253; B01D 11/0288; B01D 11/0292; B01D 11/0296; C11B 9/025; C11B 1/10; C11B 1/104
USPC .................. 422/527, 528, 530; 34/72, 79
See application file for complete search history.

(56) References Cited

U.S. PATENT DOCUMENTS

| | | | |
|---|---|---|---|
| 4,319,963 A | 3/1982 | Legast | |
| 5,951,825 A | 9/1999 | Land | |
| 5,960,563 A * | 10/1999 | Kuboyama | A23N 12/08 34/589 |
| 6,322,704 B1 * | 11/2001 | Martin | B01D 24/08 210/136 |
| 2002/0037224 A1 | 3/2002 | Zebuhr | |
| 2002/0053506 A1 * | 5/2002 | Kuboyama | B01D 5/0042 203/2 |
| 2008/0128260 A1 | 6/2008 | Balass | |
| 2009/0014392 A1 | 1/2009 | McEwen et al. | |
| 2010/0119606 A1 | 5/2010 | Whittle et al. | |
| 2010/0193446 A1 | 8/2010 | Byskov | |
| 2010/0200388 A1 | 8/2010 | Ward | |

FOREIGN PATENT DOCUMENTS

| | | |
|---|---|---|
| EP | 1 338 231 B1 | 4/2006 |
| EP | 2 294 931 A1 | 3/2011 |
| EP | 2 316 549 A1 | 5/2011 |
| JP | S51-23864 | 2/1976 |
| JP | H6-127466 A | 5/1994 |
| JP | H09-248138 A | 2/1997 |
| JP | H11-114302 A | 4/1999 |
| JP | 2000-308801 A | 11/2000 |
| JP | 2002-47143 | 2/2002 |
| JP | 3122582 U | 6/2006 |
| JP | 3131339 U | 5/2007 |

OTHER PUBLICATIONS

International Search Report and Written Opinion dated Dec. 2, 2013 for PCT/US2013/046806.
Chinese Office Action for Chinese Patent Application No. 201380043879.1 dated Dec. 31, 2015. 7 pages.
Japanese Notice of Reasons for Refusal for Japanese Patent Application No. 2015-518579 dated Sep. 19, 2017. English translation attached. 15 pages.

* cited by examiner

DISTILLATION APPARATUS FOR EXTRACTION OF ESSENTIAL OILS AND HYDROSOLS FROM PLANT MATTER WITHIN A CAPSULE

CROSS REFERENCE TO RELATED APPLICATION

The present application claims priority to U.S. patent application Ser. No. 61/662,408, filed Jun. 21, 2012, which is hereby incorporated by reference in its entirety.

FIELD OF THE INVENTION

The present invention relates to a distillation apparatus and method for extracting high quality distillates, volatile oils and hydrodistillates, as well as significantly higher quantity of volatile oils (such as essential oils and hydrosols, respectively) from organic matter placed within a capsule. The present invention is directed to extracting the high quality materials through the use of a modular distillation and separation system.

BACKGROUND OF THE INVENTION

Extraction of volatile oils from plant matter is known in the art. WO 2008/068757 to BALASS, incorporated herein by reference, relates to a small distillation apparatus for extraction of essential oils from plant matter using a container with an open mouth. The prior art container is divided into an upper chamber and a lower chamber by a removable grid. The lower chamber is partially filled with water. Plant matter such as leaves, twigs, seeds, fruits, roots, flowers and the like are placed in the upper chamber on top of the grid. The water is heated causing steam and the distillation process begins. Vapor containing essential oils from the plant matter exits the chamber and is directed to a condenser which causes the vapor to turn into liquid and then enters to a separating column. A recycling tube, which is connected to the bottom of the column, returns (according to the vessel-connected low) the water-distillate back to the container. During the process, the essential oil accumulates on top of the water-distillate left in small volume (few milliliters) within the column. The essential oil is then collected manually. However, the vapor in the device described by WO 2008/068757 is dispersed in an uncontrolled manner thus the potential efficiency is needlessly reduced. Thus, there remains a need for a small, compact, simple to operate and most efficient apparatus for short duration distillation of quality volatile oils and hydrosols from organic matter.

SUMMARY OF THE INVENTION

The present invention relates to an apparatus for extracting volatile oils and considerable volumes of hydrodestillate from plant matter by use of a modular distillation and separation apparatus. In one exemplary arrangement of elements of the disclosed apparatus, a given amount of plant matter is placed in a removable capsule. Water steam generated by the apparatus is passed through the capsule, and volatile oil is extracted from the plant matter. The mixed steam exits the capsule into a condenser and recovered in a separation unit co-extensive with the apparatus. Through the action of the condenser, the steam turns into a distillate containing water, hydrosol and volatile compounds. The liquid flows from the condenser to a separating unit where the water-hydrosol is separated from the volatile oil. The hydrosol and the oil are then separately collected from the apparatus.

Through the action of the invention, the steam distillation process described herein produces a substantially larger amount of oil than a distillation system that does not use an enclosed, modular system. For example, the present invention provides for an apparatus that allows for greater contact between the steam and plant during the distillation, than achievable in the prior art. Additionally, the present invention is directed to a system that allows the generation of higher quality hydrosol extracts than is possible in prior art devices of similar volume. Furthermore, the described apparatus provides a more efficient distillation process requiring less plant material and less energy than those provided in the art.

The present apparatus also provides for a shorter distillation time that is experience is the prior art. In one example, maintaining a brief distillation period is critical to obtaining high quality extracted and essential oils. Through this shortened time period, the distillation process reduces the naturally occurring hydrolysis of the volatile materials and also minimizes the accumulation of undesired wax (which negatively affects the oil clearance) obtained in the distillate.

The described method and apparatus is also directed to a detachable capsule adapted to be coupled to a water vessel in which the capsule includes a peripheral liquid collecting channel which surrounds the bottom floor of the capsule, and prevents returning of the condensed liquid to the water vessel. The capsule includes an outlet connected to a condenser.

Additionally, the described method directed to a process of extracting volatile oils from plant material through the use of a specialized modular container configured to maximize the quality and quantity of oil recovered from a given amount of plant matter.

BRIEF DESCRIPTION OF THE DRAWINGS

The foregoing and other features of the present invention will be more readily apparent from the following detailed description and drawings of an exemplary arrangement of the elements of the device described in which.

DISCUSSION OF CERTAIN ARRANGEMENTS OF THE ILLUSTRATED DEVICE

By way of overview and introduction, the present invention is directed to an apparatus and method for producing volatile oils and hydrodistillates safely in small quantities from small batches of organic material. The present invention produces volatile oils and hydrosols on a small scale in short processing times under standard domestic conditions. The process and devices described herein provide a simpler method of extraction of hydrosols and volatile oils, which does not require specialized technical knowledge or equipment and therefore provides improvements over the prior art.

Figure 1A:
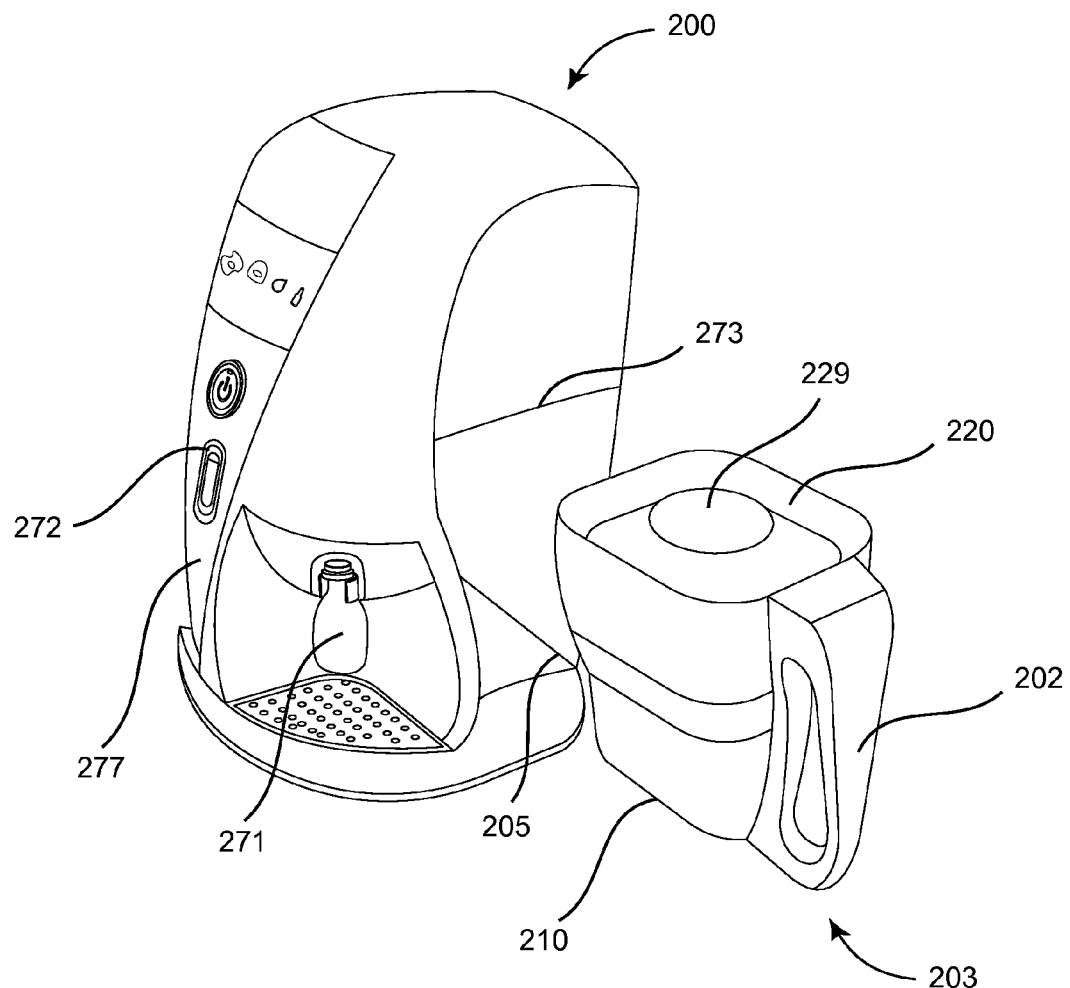
FIG. 1A illustrates a partially exploded view of the present apparatus according to an embodiment of the present invention.
Figure 1B:
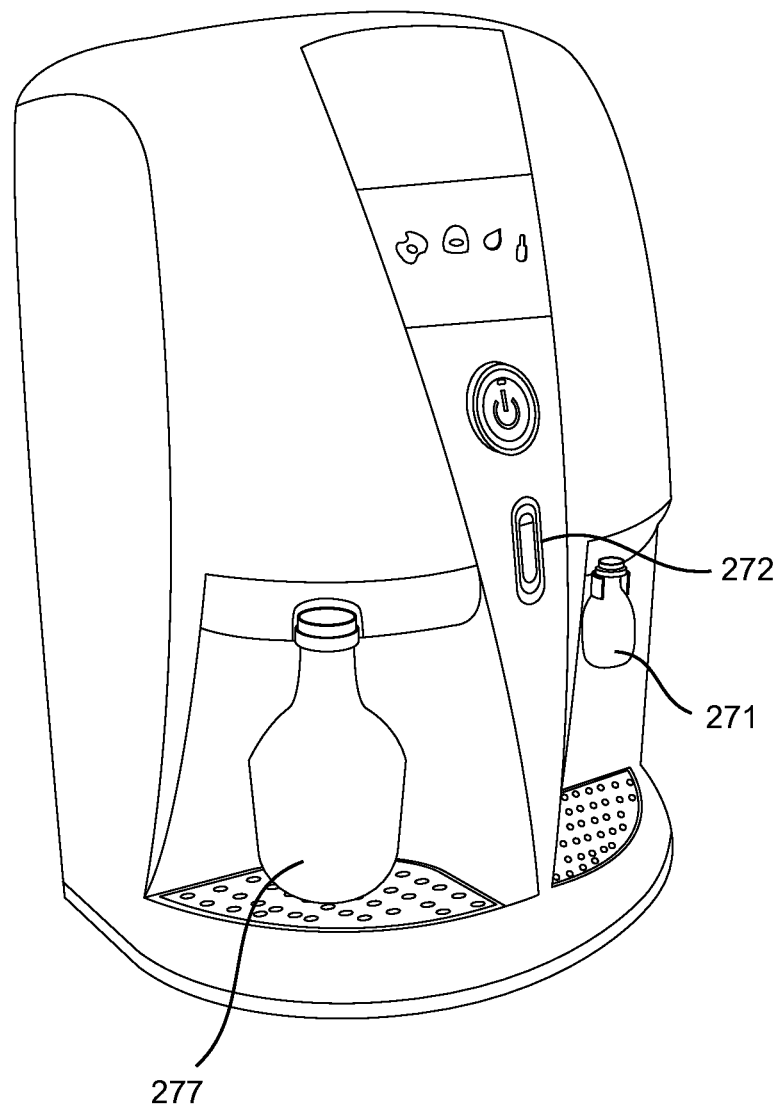
FIG. 1B illustrates a side view of the apparatus according to embodiment of FIG. 1A.
Figure 1C:
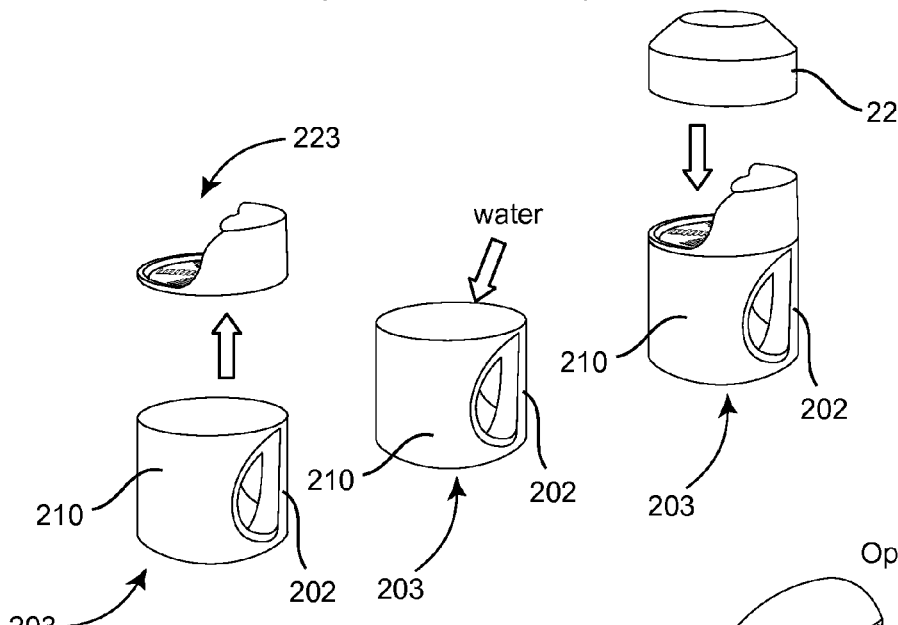
FIG. 1C illustrates an alternative view of the apparatus described in FIG. 1A.
Figure 1D:
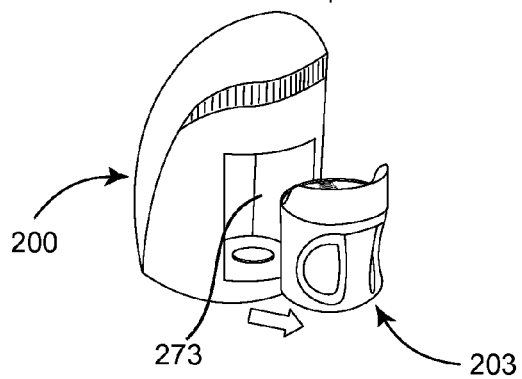
FIG. 1D illustrates a partially exploded view of the present apparatus according to an embodiment of the present invention.
Figure 1E:
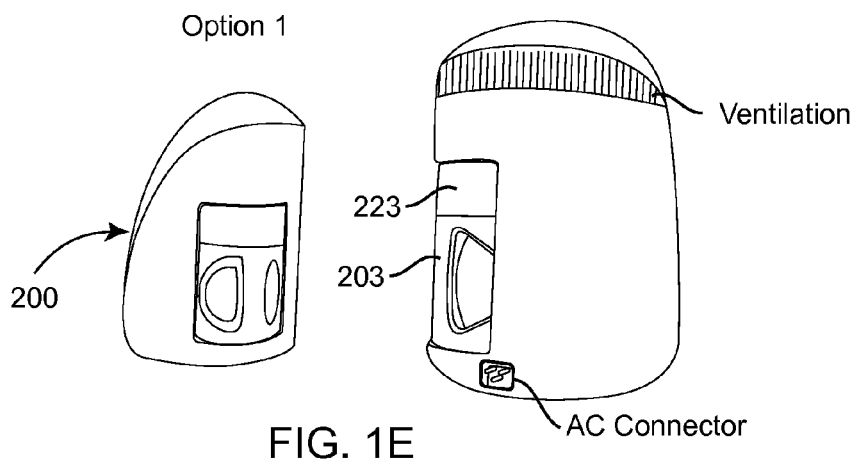
FIG. 1E illustrates an alternative view of the apparatus described in FIG. 1B.
Figure 2A:
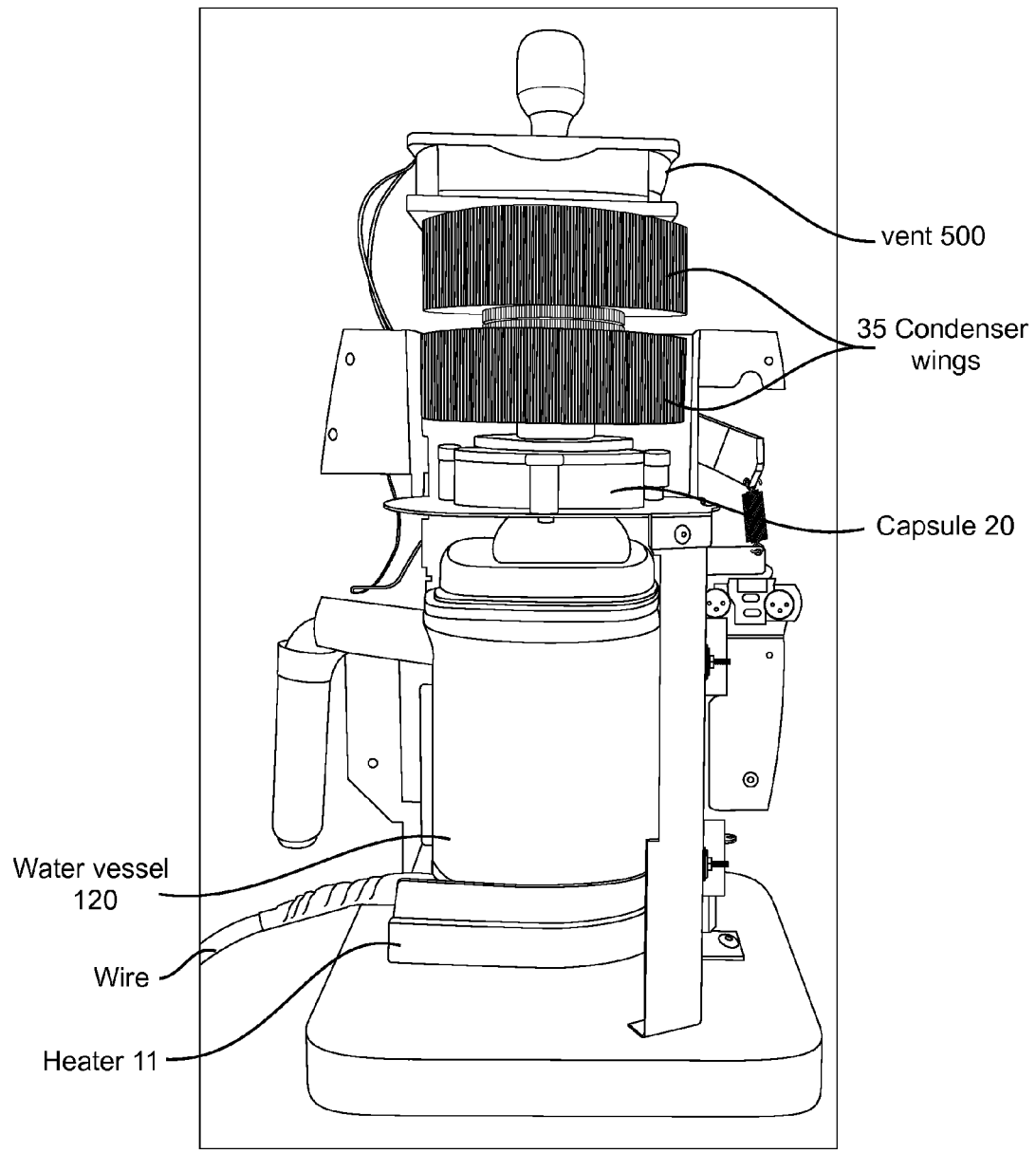
FIG. 2A illustrates a picture of an embodiment of the general apparatus of the present invention.
Figure 2B:
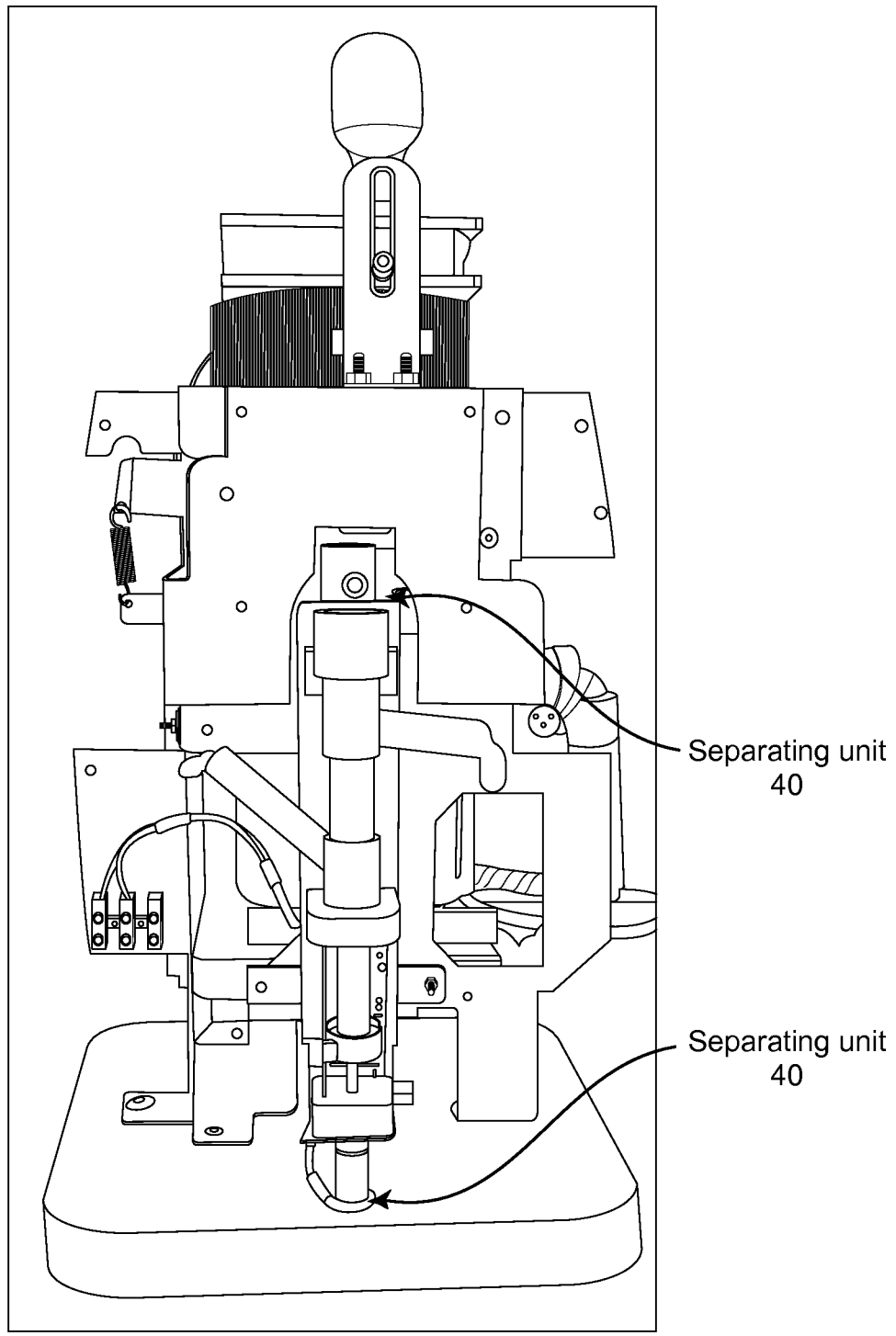
FIG. 2B illustrates a rear view of the embodiment of the apparatus described in FIG. 2A.
Figure 3:
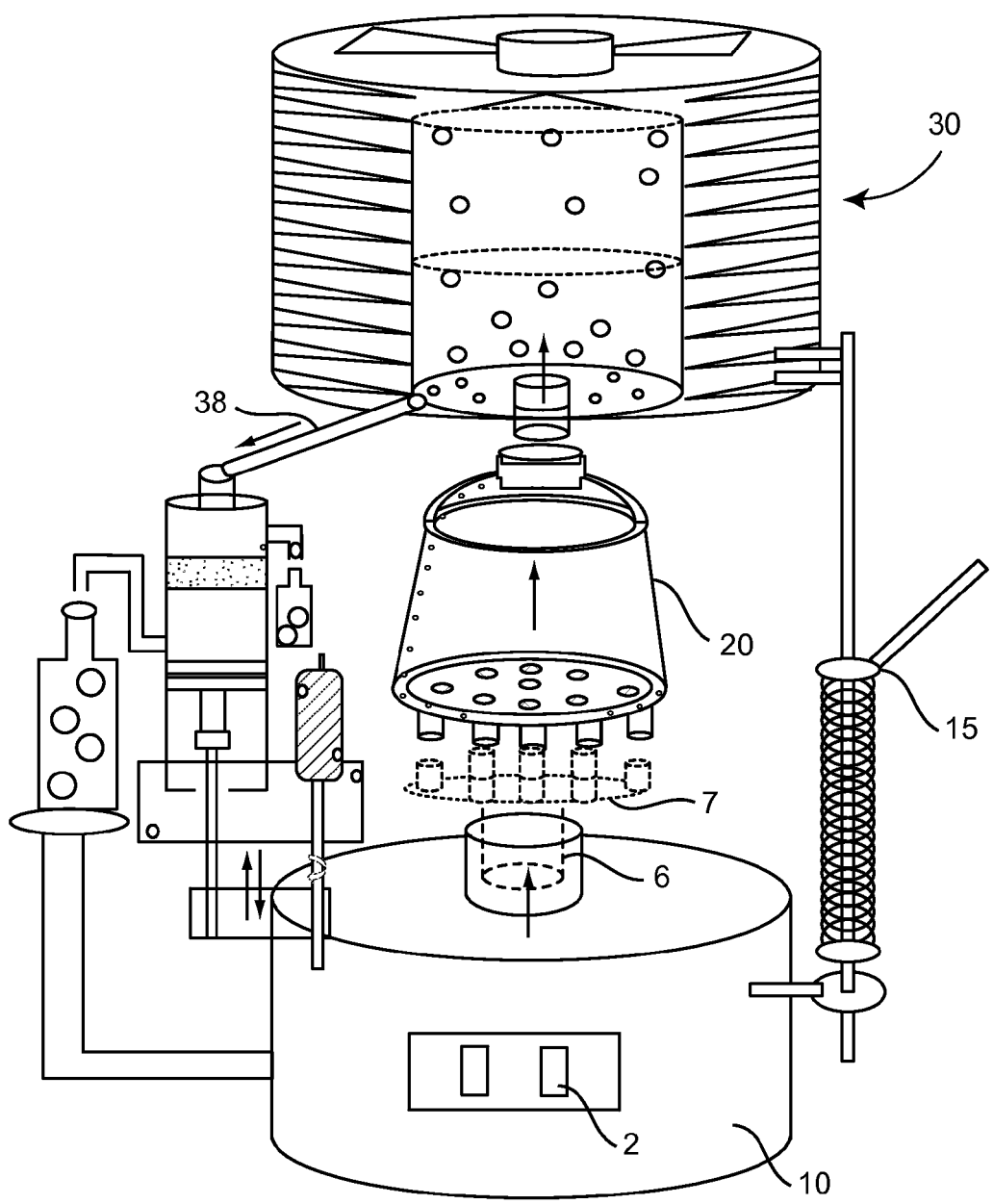
FIG. 3 provides a schematic view of elements of an embodiment of the present invention.
Figure 4A:
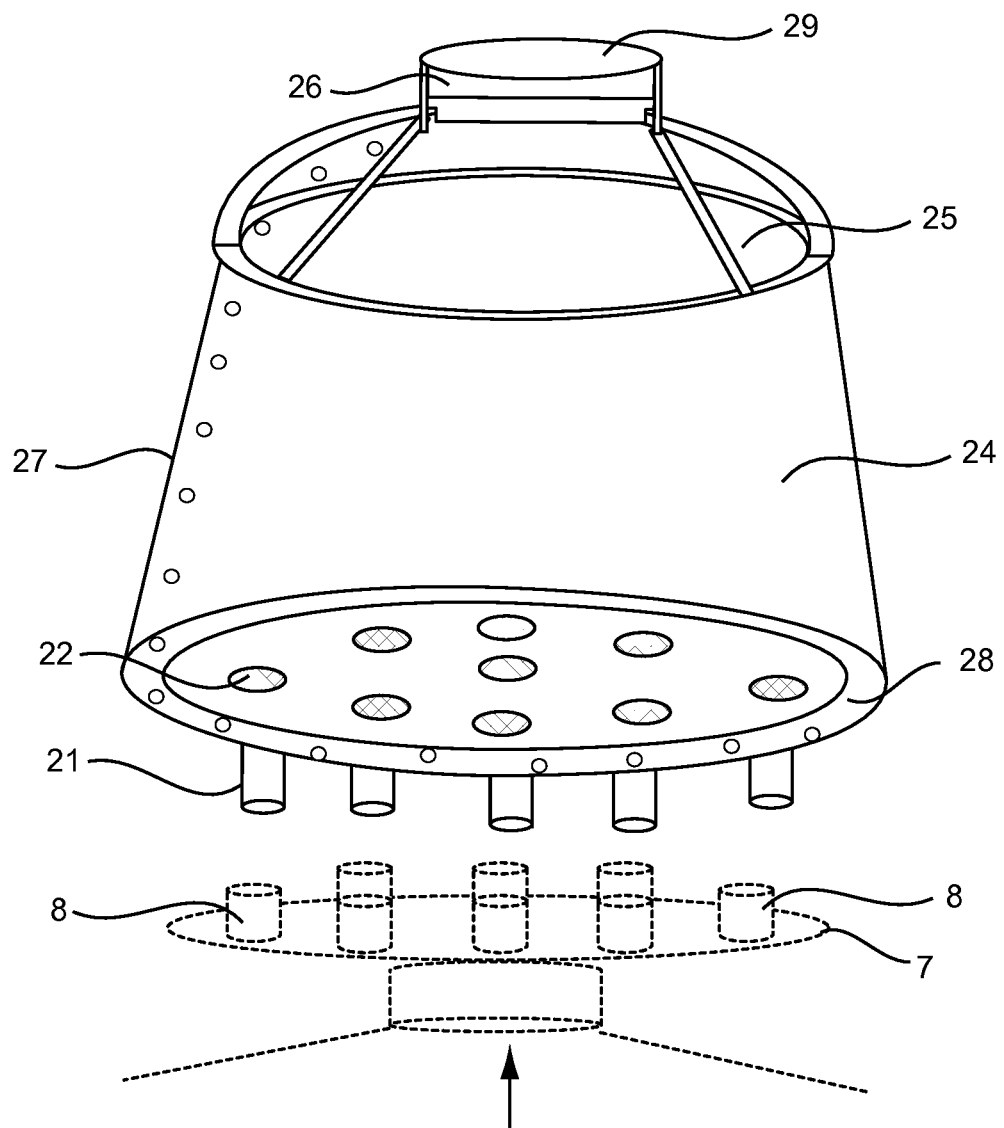
FIG. 4A illustrates a schematic view of an element according to one embodiment of the present invention.
Figure 4B:
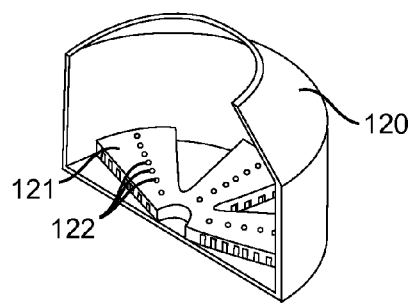
FIG. 4B illustrates a cutaway view of the element provided in FIG. 4A.
Figure 4C:
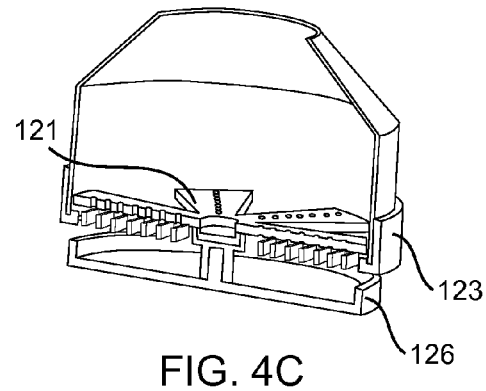
FIG. 4C illustrates an alternative cutaway view of the element provided in FIG. 4A.
Figure 4D:
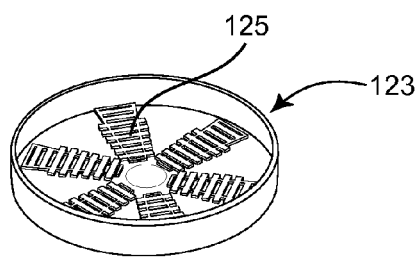
FIG. 4D illustrates a perspective view of an element of an embodiment of the invention.
Figure 4E:
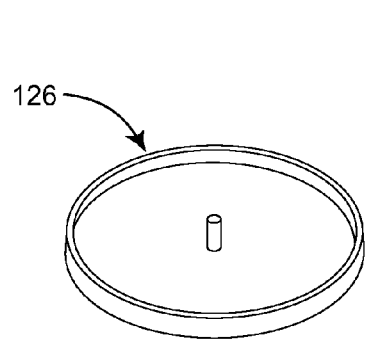
FIG. 4E illustrates a perspective view of an element of an embodiment of the invention.
Figure 4F:
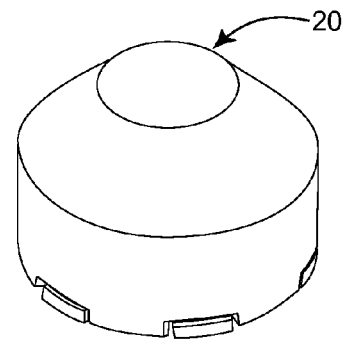
FIG. 4F illustrates a perspective view of an element of an embodiment of the invention.

As shown in FIG. 1-FIG. 3, the present invention includes at least, a vessel 10 for holding a liquid (e.g., water), a capsule 20 for holding material (e.g., an organic matter such as plant matter), a condensing unit (condenser) 30 for turning vapor (steam) into liquid and an oil separation unit 40 for separating the obtained distillate into hydrodistillate (e.g. hydrosol) and volatile oil. In one arrangement of the elements described, the apparatus is of sufficient dimensions and weight so as to fit on a standard domestic counter top or storage hardware. The present apparatus is formed out of any standard commercial grade material that is capable of withstanding the operational conditions of the device. For example, the distillation apparatus of FIG. 2 is formed out of metal, plastic, glass, carbon fiber, synthetic materials or fabrics or other natural materials.

For ease of illustration, the vessel 10 is described herein as being a water vessel and the liquid being water. While this is one preferred and exemplary embodiment, other embodiments are possible in which the liquid is not water.

The vessel 10 is a configured, in a particular arrangement, to hold a necessary volume of liquid for use in the distillation process. The water vessel in one configuration includes an optional heating unit (not shown) for creating steam. In one material configuration, the heater is an electrical heater. In another configuration, the heater is a combustion based heater. In a particular arrangement of elements, the heater is located at a bottom portion of water vessel 10. This heating unit 11, in one example is configured to generate steam from the volume of water stored in the water vessel. For example, the heater 11 is configured to generate the necessary thermal energy to evaporate the cubic volume of water at a steady state. The heater is also configured to employ standard heating techniques and practices. Furthermore, in a given arrangement, the heater is a commercially available module or addition that is removable from the distillation apparatus. In operation, the steam is designed to exit the water vessel at an outlet tube 6. In another arrangement, filling of the water vessel 10 is done prior to securing to the capsule to the overall apparatus. However, alternative procedures are possible and envisioned.

In a further arrangement, the heating of the water is controlled by an optional thermostat configured to be co-extensive with the heating unit. The heating unit is configured with the necessary safety precautions, such that in the event of excess thermal energy or malfunctions the unit is deactivated.

As shown in FIG. 3, the water vessel 10 is coupled directly to capsule 20. In certain arrangements, the water vessel 10 is coupled via the use of an adaptor. As shown in the illustrated arrangement, the outlet tube 6 is connected to an adapter 7. The adapter 7 is coupled to the capsule 20. According to an illustrated arrangement alternative, the steam exiting the outlet tube 6 is dispersed into a plurality of tubes 8 configured on the adapter 7. This allows the steam to evenly disperse within the capsule 20. In a specific configuration of elements, the outlet tube 6 and adapter 7 are arranged such that they employ the use of thermal resistant plastic in order to reduce the heat passed to the condenser.

The apparatus of the present invention further includes a detachable capsule 20. The capsule has a hollow interior 24 that is filled with material, such as leaves, twigs, seeds, fruits, roots, flowers and the like. In one arrangement, the plant matter may be compressed within the capsule. In another arrangement, the capsule volume is in dry (mostly grinded or crushed) plant material.

According to another embodiment, the capsule 20 includes a plurality of tubes 21 that connect to the adapter 7, by placing the adapter tubes 8 within their corresponding capsule tubes 21. Each capsule tube 21 includes an O-ring at its upper inner portion (not shown), thus causing a hermetic sealing between the capsule tubes 21 and their corresponding adapter tubes 8. This hermetic seal prevents the steam from leaking out and ensures that all of the steam enters the capsule. Optionally, according to a different embodiment, the capsule tubes are narrower than the adapter tubes. The narrow capsule tubes enter the wider adapter tubes and the adapter tubes comprise the O-rings at their inner bottom portion.

As seen in FIGS. 4A-4F, a plurality of nets or grating 22 are placed at the top ends of the capsule tubes 21. The nets 22 have appropriate mesh size to prevent the plant matter from falling through the tubes 21. The steam enters the capsule 20 through the tubes 21 located at the capsule 20 and pass through the plant materials. This action extracts volatile oil and volatile water-soluble compounds present in the plant materials. The extracted volatile oils and other volatile material then mix with the steam. The steam mixture exits the capsule 20 at outlet 26 and reaches the condenser 30.

The capsule 20 includes a rounded dome shaped top portion 25. The majority of the steam mixture exits the capsule at outlet 26. It should be noted that a small portion of the steam occasionally turns back into liquid and collects on the side and top edges of the capsule 20 due to the conical shape of the top wall. The liquid at the top portion 25 flows to the side edges of the capsule 27 and from there along the side edges 27 into a liquid collecting peripheral channel portion 28 which surrounds the bottom of the capsule and also surrounds the inlet locations (and nets 22). This channel portion 28 is configured to retain liquid that had condensed inside the capsule and prevents it from returning back to the water vessel 10. Otherwise, the liquid would return to the water vessel and the quality of the whole distillation process would decrease because the liquid would turn to steam again but with many materials already extracted from the plants. This affects the quality of on-going distillation process by not enabling a pure 100% steam distillation process. However, the present invention capsule allows 100% steam distillation with 100% incoming water steam and prevents (or minimizes) the return of liquid (comprised of a mixture of the previous steam and previous plant extracts) to the water vessel. This feature enables obtaining a higher quality of oil extract and hydrosol. As further illustrated in FIG. 2A, a vent 500 is provided.

As further seen in the illustrated embodiment, the side edges 27 of capsule 20, are, in one example, slanted thus assisting the liquid to flow (along the side edges 27) to the liquid collecting peripheral channel portion 28. Also, the bottom surface of the capsule is, in one example, slanted to assist liquid accumulating on the bottom surface to flow to the peripheral channel portion 28.

Furthermore, the capsule 20 further includes removable material 29 at the edge of outlet 26 for closing and sealing. The material 29 is, in the illustrated embodiment, aluminum foil. However those skilled in the art will appreciate that any material that is suitable for the actions describe is envisioned. In a particular operational sequence, a tightening lever 15 is released (lifted) causing the condenser 30 and the water vessel 10 to further separate one from the other. The capsule 20 in this arrangement is disposable or refillable. The capsule 20 is placed on the adapter 7 such that the capsule tubes 21 penetrate the adapter tubes 8. The removable material 29 is removed and the outlet 26 (which is a tubular member) is placed under inlet 31 of condenser 30. In the illustrated configuration, the inlet 31 is also a tubular member. Outlet 26 includes an O-ring at its inner bottom side for efficient sealing (in the same manner as explained in relation to elements 8 and 21). In a particular operational sequence, the lever 15 is lowered and the inlet 31 penetrates outlet 26 and causes a tight sealing. Accordingly, the adapter tubes 8 and the capsule tubes 21 are tightly sealed. Thus, the apparatus is sufficiently configured to undertake the distillation process.

Continuing that sequence of operation steps provides for the extraction of the capsule 20, using the lever 15 to lift the elements one from the other and thus the capsule 20 can be easily removed.

According to another configuration of the illustrated device, the water vessel 10 is coupled directly to capsule 20 thus without the need for an adapter, as shown in FIGS. 4B-4F. The capsule body 120 includes a plurality of step-sector elements 121 (raised landings in a spoke-like configuration) attached to the floor (or made integral therewith) of the capsule 120, each equipped with a plurality of holes 122 (in one example approximately each hole has a diameter of 2 mm). The capsule body 120 is positioned in a circular capsule base element 123. The capsule base element includes a plurality of track-like sector elements 125 (elevated relative to the floor) corresponding to and placed under the step-sector elements 121. The steam coming from water vessel 10 passes through the track-like sector elements 125 (as by passing through openings therein) and then through the holes 122 into the inside of the capsule body 120. Optionally, the capsule 20 includes a liquid collecting tray 126 placed under circular capsule base element 123 where the unwanted condensed liquid from the peripheral channel portion 28 can flow to (e.g. by a hole in channel portion 28).

Figure 5A:
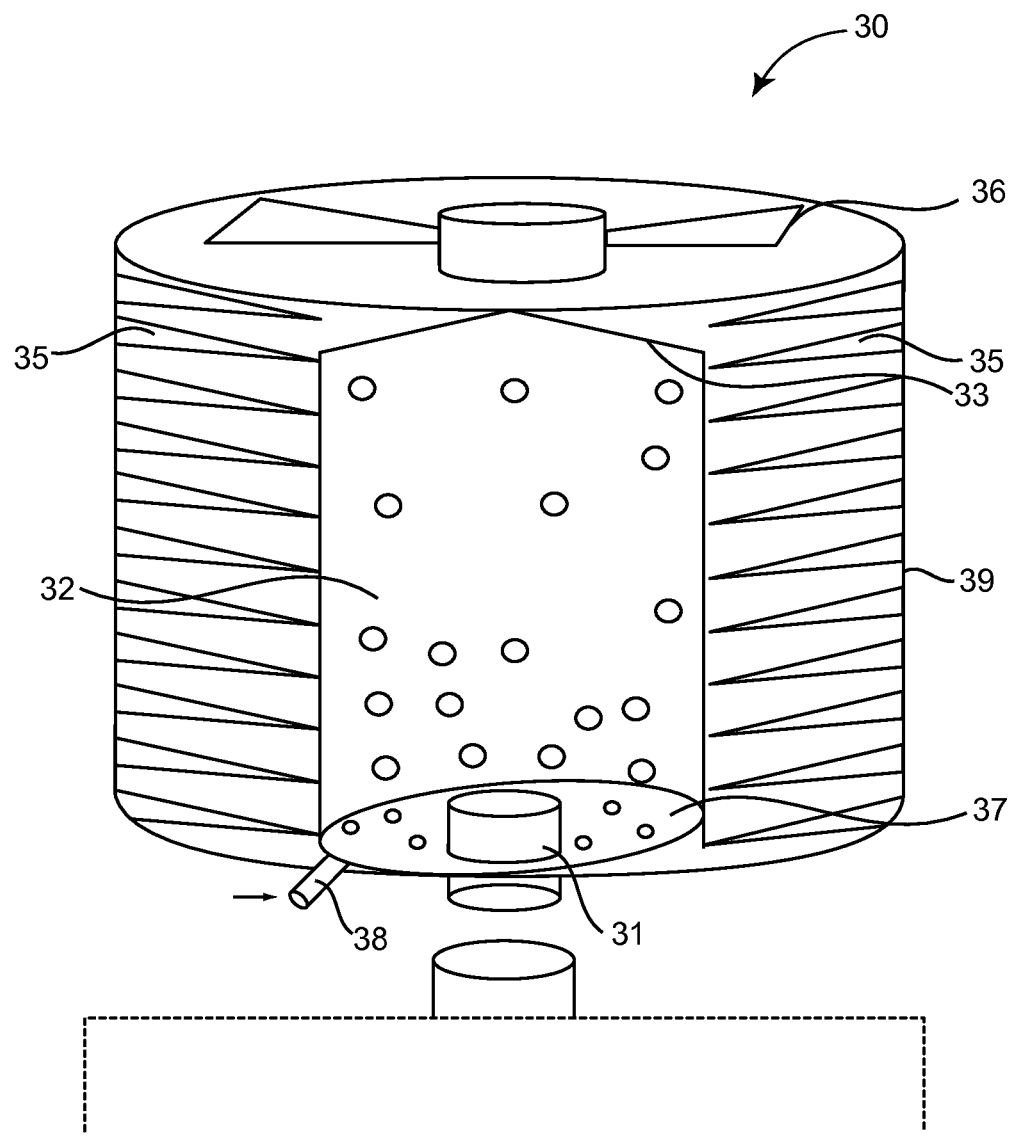
FIG. 5A illustrates a schematic view of an element according to one embodiment of the present invention.
Figure 5B:
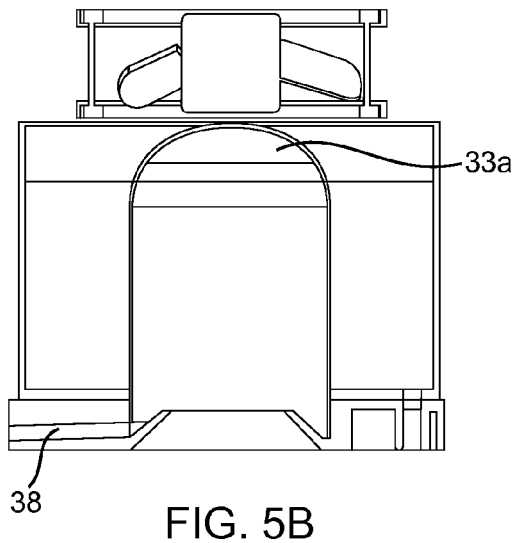
FIG. 5B illustrates a cutaway view of the element provided in FIG. 5A.

As shown in FIGS. 2A and B as well as 5A-5F, the capsule 20 is coupled to the condenser 30. Steam is directed from outlet 26 of capsule 20 enters inlet 31 of condenser 30, as shown in FIG. 5A. Inlet 31 is a relatively short tubular member. The steam exits inlet 31 and enters inner chamber 32 where the steam vapor is condensed into liquid. The condenser includes a plurality of wings 35 which extend from the outer wall of chamber 32 (see FIGS. 1-3, 5, 7). The wall of chamber 32 is thin and in one example is made of stainless steel. The wings 35 (in one example made of aluminum) assist in cooling the vapor steam mixture, by absorbing the heat produced in chamber 32 and radiating the thermal energy to the ambient air. The wings 35 thus act as heat exchanging elements.

According to an alternative embodiment of the present invention, a heating unit 205 is not placed within the water vessel but within the main apparatus structure 200, as indicated in FIGS. 1A-1E. The main apparatus structure 200 includes the condenser and the separation unit 7 as explained hereinabove. The capsule 220, however, is placed on top of the water vessel 210 to form a jug like structure 203 (hereinafter referred to as jug 203) including a handle 202. The main structure further includes the heating unit 205. The removable jug like structure 203 is put in the main structure 200 on top of the heating unit 205. The heating unit 205 heats the water within the water vessel 210 and causes steam. The capsule 220 is placed on the circular capsule base element 223, as explained hereinabove. The circular capsule base element 223 is also used as a cover for the water vessel 210.

The removable aluminum foil 229 is removed and the jug 203 is inserted into an appropriate chamber 273 in the main structure 200. The heating unit 205 (on the bottom of the chamber 273) heats the water vessel and the steam rises and enters the capsule 220 through the capsule base element 223 as explained hereinabove. The distillate steam rises and exits the capsule into the condenser (not shown) to which the capsule is coupled and secured to when being inserted into the main structure 200 (e.g. by a clicking/securing element).

The heating unit 205 is placed in opposition to the bottom surface of the chamber 273, either above the bottom surface or hidden, under the bottom floor surface of chamber 273. The length and width of heating unit 205 are each, in one example, between 3 cm-5 cm.

The condenser and separation unit and connection there between are not shown since they are within and covered by the (in one example plastic) covering of the main structure 200. Their function and interaction is as explained hereinabove. Oil collecting bottle 271 and hydrosol collecting bottle 277 can be shown in FIGS. 1A and 1B. The separation chamber can be viewed by a user through a transparent window 272.

An optional fan 36 is placed on the top portion of the condenser which directs a column of air towards the wings 35. According to another embodiment, the fan 36 creates a stream of air that travels upwards, thus the air travels aside the wings 35 upwards towards the fan 36 and out of it, and the cooling process is accomplished as above.

Figure 5C:
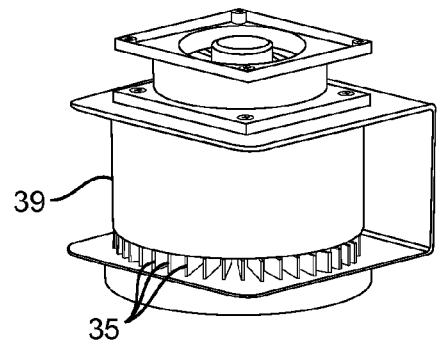
FIG. 5C illustrates an perspective view of the element provided in FIG. 5A.
Figure 5D:
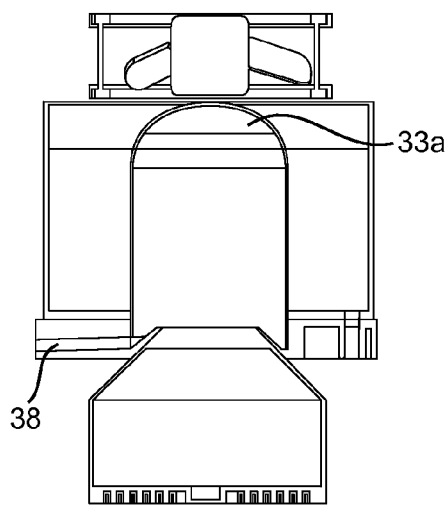
FIG. 5D illustrates a cutaway view of an element of an embodiment of the invention.
Figure 5E:
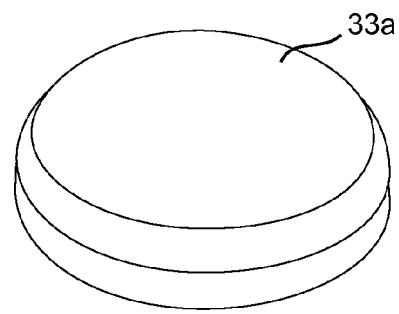
FIG. 5E illustrates a perspective view of an element of an embodiment of the invention.
Figure 8:
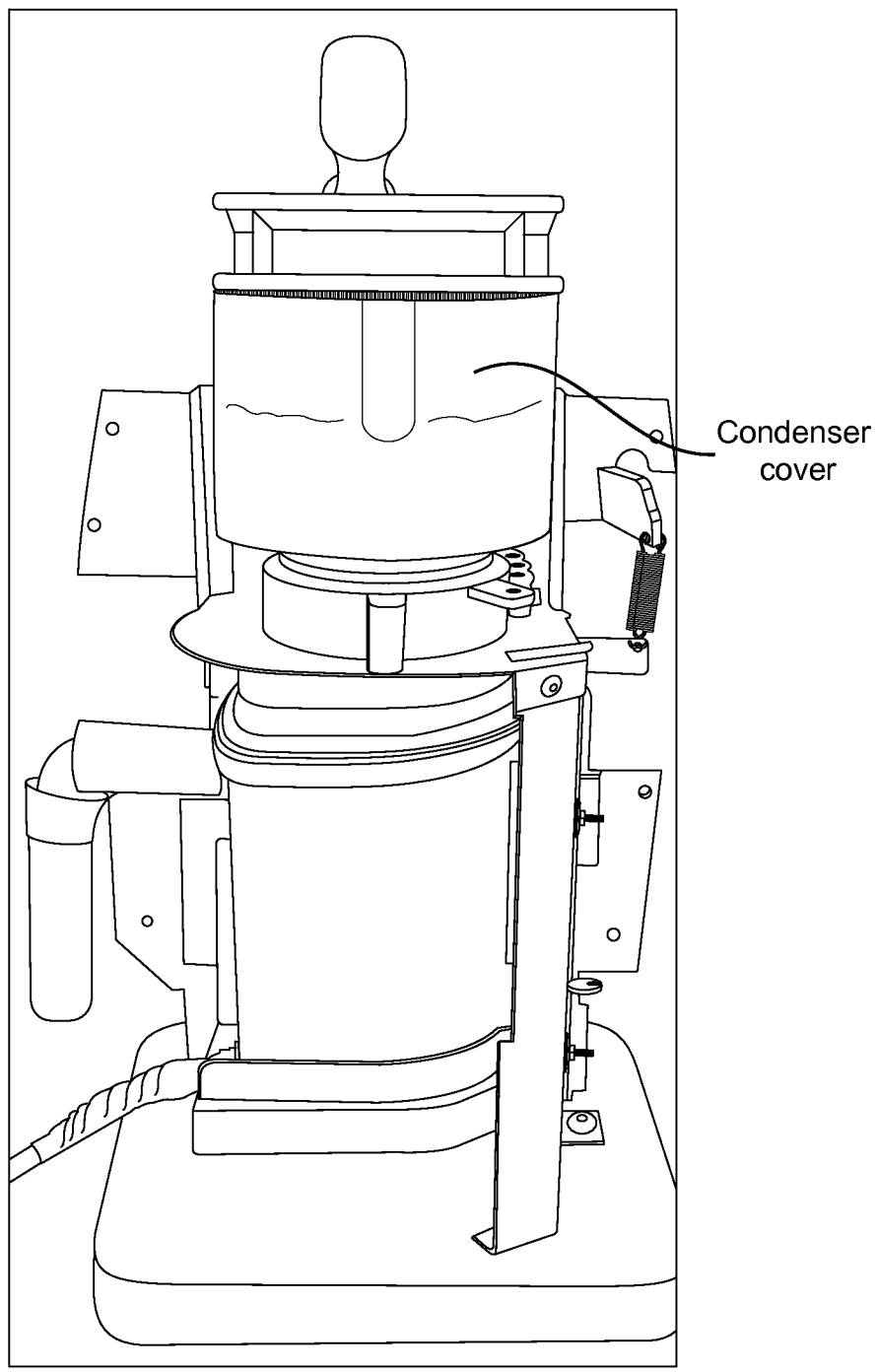
FIG. 8 illustrate a picture of an embodiment of the general apparatus of the present invention.

According to an alternative embodiment, the condenser 30 further includes a cylindrical covering outer wall 39 which covers the condenser lengthwise, as shown in FIGS. 5C and 8. This contributes to the efficiency of the cooling since the fan 36 forces a large volume of air to pass within the outer wall 39 thus increasing the stream of air passing aside the wings 35 and cooling them with higher efficiency. The hot air accumulating beside the wings is blown out. The outer wall 39 in one example includes a thermal conductible, such as metal.

Due to the cooling of chamber 32, the steam vapor mixture turns to a liquid mixture herein referred to as distillate, and the distillate gathers into outlet tube 38 which is connected to the separation unit 40. The bottom floor 37 of chamber 32 is slanted, thus causing all of the obtained distillate to flow downwards to outlet tube 38 which is placed at the most bottom edge of floor 37. The ceiling 33 of chamber 32 is also slanted, in one example cone-shaped (see FIG. 5A). This causes the liquid to flow downwards to the side edges of chamber 32 thus preventing dripping of liquid drops from ceiling 33 back into inlet 31 and returning to the capsule 20. Thus, almost all of the vapor turning into liquid can be collected and the present invention most efficient. According to a specific embodiment, the ceiling 33a (shown in FIGS. 5B, 5D and 5E) has a dome shape giving the same effect.

Figure 5F:
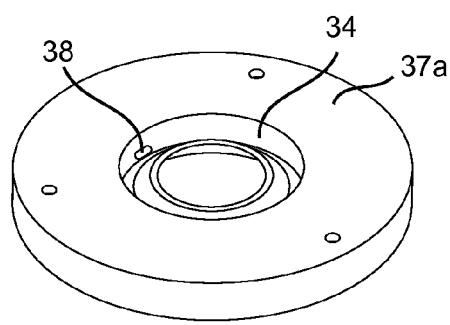
FIG. 5F illustrates a perspective view of an element of an embodiment of the invention.

According to the illustrated configuration, the floor 37a is slanted inwardly (low portion towards the center), as shown in FIG. 5F. The distillate flows inwardly and falls into a circular channel portion 34 located at the floor center. The liquid distillate then exits channel portion 34 at outlet tube 38. Outlet tube 38 is in one example approximately about 2-5 cm long or longer and has a diameter of in one example approximately 1 cm. It is in one example made of stainless steel but could also be made of other materials such as plastic. In one example, the channel portion 34 is slanted such that outlet tube 38 is placed at the lowest point in channel portion 34 so that all the obtained distillate will exit the condenser 30. The inner surface of the condenser 30 and the inner surface of tube 38 is smooth thus assisting mobility of the liquid. The floor 37a and channel 34 are in one example made of plastic in order to keep the liquid as cool as possible.

In one example, the condenser 30 has a general diameter (of covering outer wall 39) of between 7 $cm^{-13}$ cm (such as—10 cm). The condenser 30 has a general height in one example between 6 $cm^{-10}$ cm (in one example—8 cm). Covering outer wall 39 is in one example made of metal such as aluminum. The wings 35 in one example extend and have the length of the general diameter of the covering outer wall 39. The plurality of wings 35 are in one example placed approximately 2 mm one from the other.

In one example, the fan 36 has a general diameter is in one example between 7 $cm^{-13}$ cm (in one example—10 cm). The fan 36 also has a general height between 1.5 cm-2.5 cm (for example—2 cm). The fan 36 is, in one example, made of plastic (such as the fans used in domestic computers and laptops).

The inner chamber 32 inner wall is in another example made of stainless steel and is smoothly polished. This feature assists cleaning and prevents accumulation of waste materials. The inner chamber 32 inner wall diameter is, in one example, between 3 cm-5 cm (in another example—4 cm). The inner chamber 32 inner wall general height is in one example between 5 cm-9 cm (in one example—7 cm).

In one example the tube 38 is made of stainless steel. In this example, the general diameter of tube is between 0.5 cm-5 cm (such as—1 cm). The length of tube 38 is in one example between 3 cm-5 cm (such as—4 cm).

Tube 31 is, in one example, made of plastic (thus reducing the conductivity of heat to the condenser 30). The general diameter of tube 31 is in one example between 1 cm-2 cm (such as—1.6 cm). The length of tube 31 is in one example between 1 cm-2.5 cm (such as—1.5 cm).

Ceiling 33a is in another example made of smoothly polished stainless steel. The general diameter of its bottom portion is in one example between 3 cm-5 cm (in one example—4 cm). The height of ceiling 33a is, in one example, between 1 cm-2 cm (in one example—1.5 cm).

Circular channel portion 34 is in one example made of boiling resistant plastic (thus reducing the conductivity of heat). The general diameter of circular channel portion 34 is in one example between 2 cm-5 cm (in one example—3 cm). The depth of the circular channel portion 34 is, in one example, between 0.5 μm-1.5 cm (in one example—1 cm).

Throughout the distillation process, the apparatus system is not a closed system but an opened to air system, i.e. there are holes throughout the elements of the apparatus that prevent accumulation of pressure (e.g. steam pressure) within the apparatus system. If there would be pressure in the system, it would increase the hydrolysis of some of the plant material that is desired to be obtained. This would negatively affect the quality of the volatile oils and the hydrosols as well. Examples of such holes (with diameters of in one example 3 mm-5 mm) are placed for example on the upper portion of channel 34 or on the upper portion of tube 38, etc.

Figure 6A:
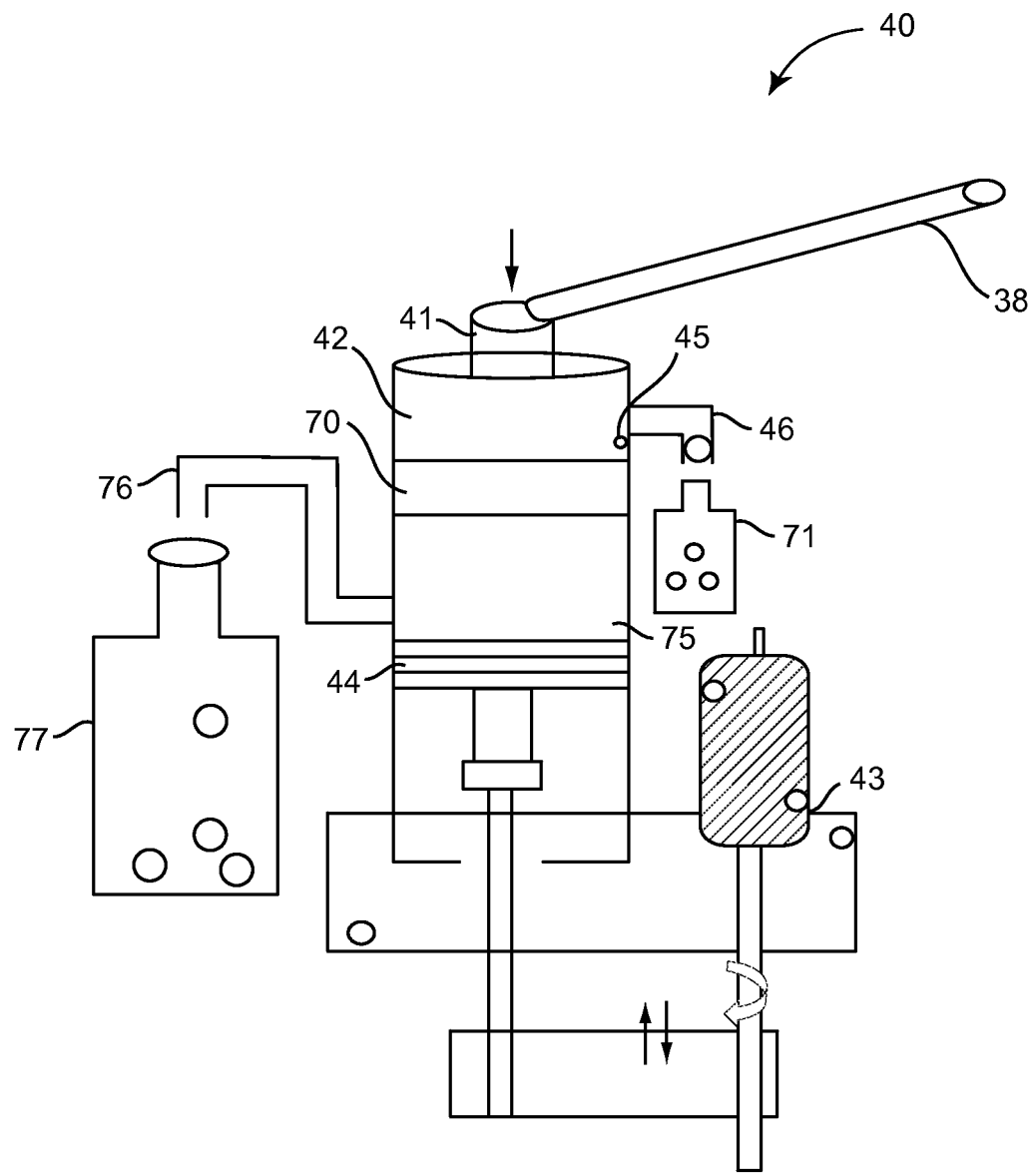
FIG. 6A illustrates a schematic view of an element according to one embodiment of the present invention.

The condenser 30 is coupled to the separation unit. The liquid coming from outlet tube 38 of condenser 30, enters inlet 41 of separation unit 40 to which outlet 38 is coupled to, as shown in FIGS. 3 and 6A. Inlet 41 is a relatively short tubular member. The liquid distillate exits inlet 41 and enters separation chamber 42 (in one example made of glass)

where the distillate containing the hydrosol (mixed) and the oil extracts are to be separated. The low density of the volatile oil 70 causes the oil to accumulate and float above the hydrosol 75 and the separation is accomplished accordingly.

In one particular operational sequence, the separation can be implemented by opening a valve at the bottom of a separation chamber extracting the hydrosol into a bottle, closing the valve, bringing an oil bottle, opening the valve and collecting the oil in the oil bottle. However, this procedure can result in spillage and contamination of the oil.

Therefore, according to an alternative series of steps to provide for an enhanced essential oil recovery method, the separating unit 40 further includes an electric motor 43 which drives a piston 44 through the separation chamber 42 (FIG. 6A), wherein a head of the piston 44 has a diameter the size of the separation chamber 42 diameter, such that its edges press tightly on the sides of the separation chamber 42 and prevents leakage of liquid from its sides. The hydrosol 75 carrying the floating oil 70 is located on top of the piston 44. After an amount of hydrosol 75 and oil 70 are collected, the distillation process is stopped. After all the steam turns to liquid and flows at the separation chamber 42, the oil can be separated.

The motor is activated driving the piston upwards such that the oil exits outlet tube 46. A sensor (e.g., an electrode) 45 is placed on the inner side edge of the separation chamber 42 approximately touching the bottom of outlet 46. The sensor 45 detects the presence of water/hydrosol or volatile oil. For instance, the sensor is designed to detect the change in conductivity present between oil and the water hydrosol mixture. Upon detection of the oil by the sensor, the piston 44 is driven upwards thus the oil exits outlet tube 46 into a collecting bottle 71. At the moment that approximately all of the oil exits tube outlet 46, the hydrosol reaches and triggers the sensor to send a signal indicating that oil is not being sensed at this location. This causes the closing of an electric circuit and triggers the motor 43 to stop. Then the motor 43 drives the piston 44 to move downwards until it reaches a point such that the hydrosol can be collected. In one example, a valve connected to the outlet tube 76 is opened and the hydrosol exits the outlet tube 76 into a collecting bottle 77. In addition, a second sensor can be located below the second outlet tube 76 and be configured to sense completion of the process by not sensing a liquid at the location (e.g., a sensor for sensing the presence of a liquid).

Furthermore, the feature of floor 37, of the condenser is tilted such that it causes the flow of all of the distillate and prevents drops of distillate from dripping onto the oil layer during the extraction process of the oil. On the other hand, collecting the hydrosol phase after removing the entire oil phase yields a preferable hydrosol product for uses such as Aromatherapy.

Figure 6B:
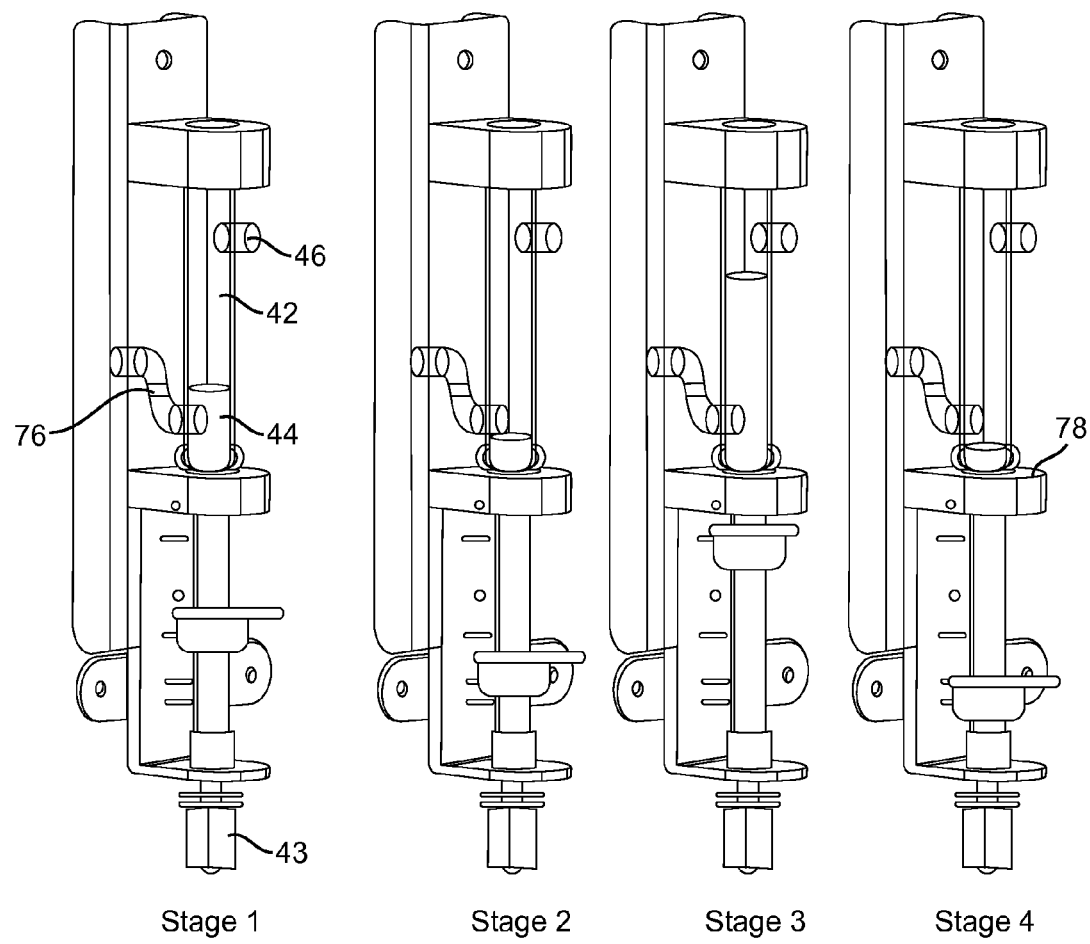
FIG. 6B illustrates a several views of the element provided in FIG. 6A.

According to an alternative sequence of steps the piston 44 is positioned above the exit point of outlet tube 76 (stage 1), as shown in FIG. 6B. When sufficient distillate is collected in a manner sufficient to prevent the oil from entering outlet tube 76 (in one example after a time determined according to a timer), the piston 44 is lowered (by the motor 43) beneath the outlet tube 76 exit point (stage 2) such that the hydrosol enters outlet tube 76 and exits the tube 76 from its other end such that the liquid top level (i.e. oil on top+hydrosol on bottom) in the separation chamber 42 is at the same level as the most top portion of tube 76 according to the 'connected vessels law'. During the distillation operation, the distillate enters the separation chamber 42 and the hydrosol is collected (except for the hydrosol which stays in the separation chamber 42 and the exit tube 76 according to the connected vessels law, wherein at the end of the distillation process separation chamber 42 in one example approximately holds 1.5 cc of hydrosol beneath approximately 2.5 cc of oil). At stage 3 the piston 44 is raised and the oil is collected until the piston 44 is stopped by the sensor according to the distinction of different materials, as explained hereinabove. Then, at stage 4, the piston 44 is lowered beneath the outlet tube 76 exit and beneath liquid collecting tray 78 and the remaining hydrosol in the separation chamber 42 and the exit tube is discharged at liquid collecting tray 78. Optionally, this mode of operation can be automatically (begin operation, piston location at different stages, turning off heating unit and fan, collecting oil, etc.). This automatic functionality includes the use of a control unit, such as a processor or computer executing a stored instruction set. For example, FIG. 9B provides a control circuitry 502 for controlling the device described and the functions therein.

The distillate within the separation chamber 42 separates into hydrosol (on the bottom) and aromatic oil on top. A small amount of plant material wax is often accumulated even with the efforts of the high quality distillation. The wax mainly accumulates between the oil layer and the hydrosol layer, but when it mixes with the oil, it takes time until it sediments beneath the oil layer and the oil is in the meantime turbid to some degree. When the distillate falls from inlet 41 splashing on the top oil layer it causes the oil and wax to mix. To avoid this problem (in a manner such that the oil will stay pure and clear without mixing with the wax), according to an alternative embodiment of the present invention, the distillate is delivered from the condenser 30 to the separating chamber.

Figure 6C:
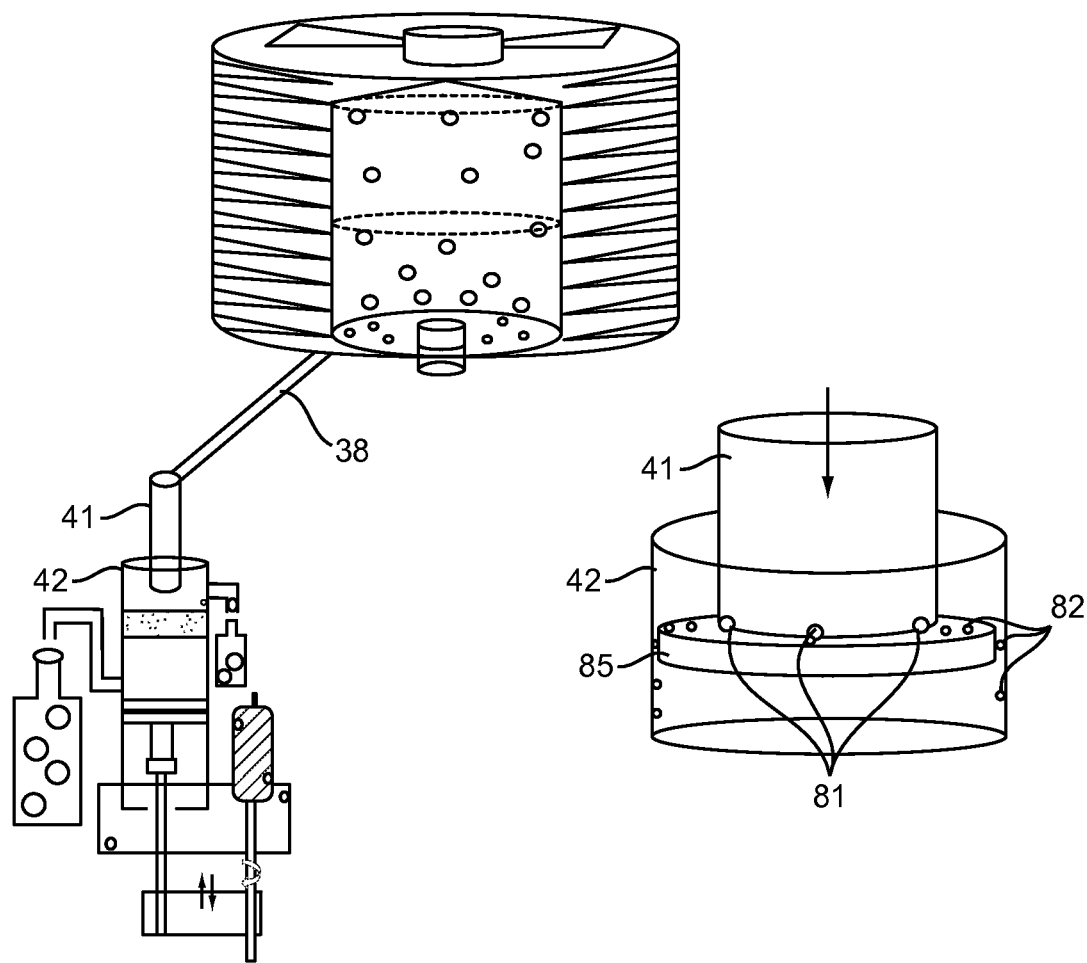
FIG. 6C illustrates an schematic view of the element provided in FIG. 6A.

As seen in FIG. 6A-6C, a disc shaped element 85 (in one example made of plastic or stainless steel) is connected to the bottom end portion of inlet 41 such that the distillate exits inlet 41 through a plurality of holes 81 to the disc element 85 surface. Each hole 81, in one example, can have a diameter of 2 mm. The inlet 41 is shaped as a tube in one example approximately having the diameter of 8 mm. The disc element 85 possesses a diameter about slightly smaller than the separation chamber 42 diameter, such that the distillate 82 flows on the disc element 85 to its edges, passes the small gap (in one example approximately 1 mm) and then gently flows down the inner wall of separation chamber 42. The distillate reaches the top oil level 70 within the separation chamber 42 in a gentle manner such that the wax layer almost does not mix with the aromatic oil. Thus, the oil stays pure (clean), uncontaminated by wax and non-turbid as desired. Such pure and clear aromatic oil is acceptable for immediate usage.

Figure 6D:
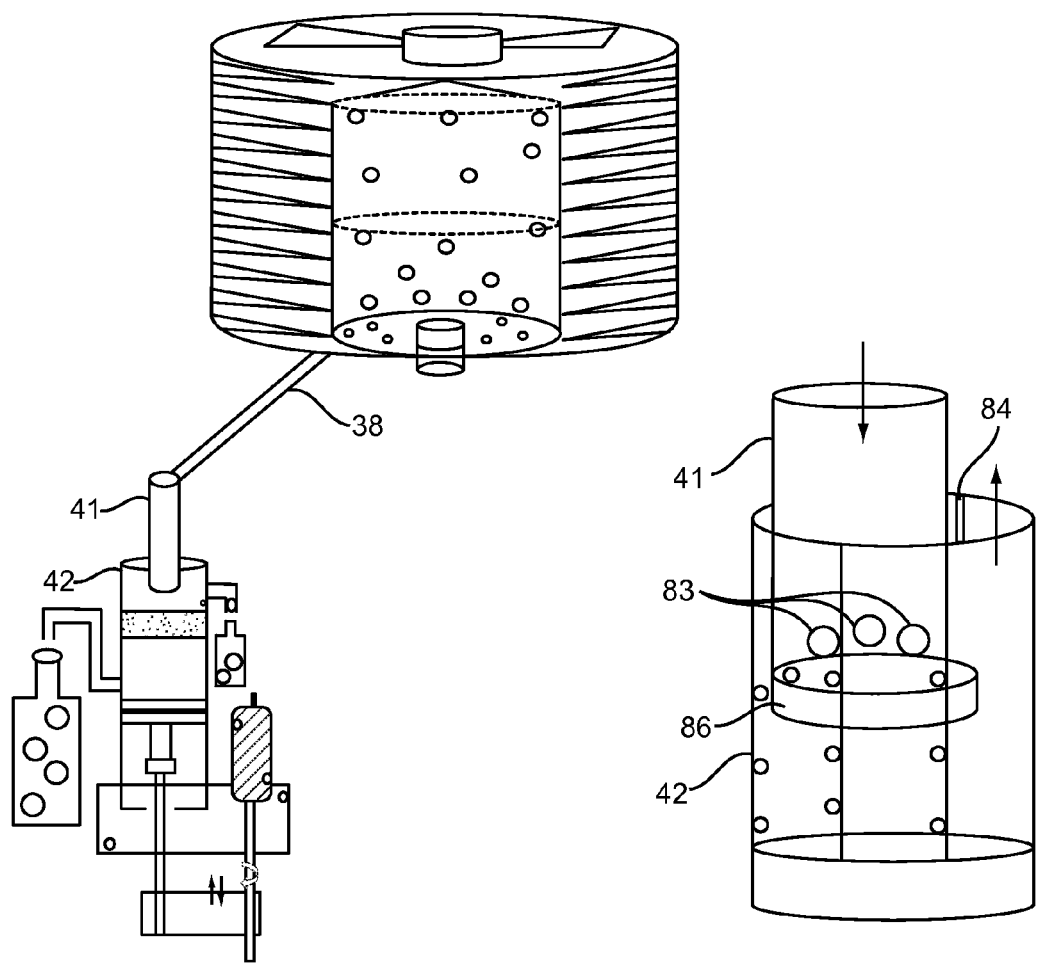
FIG. 6D illustrates a schematic view of an element of an embodiment of the invention.
Figure 6E:
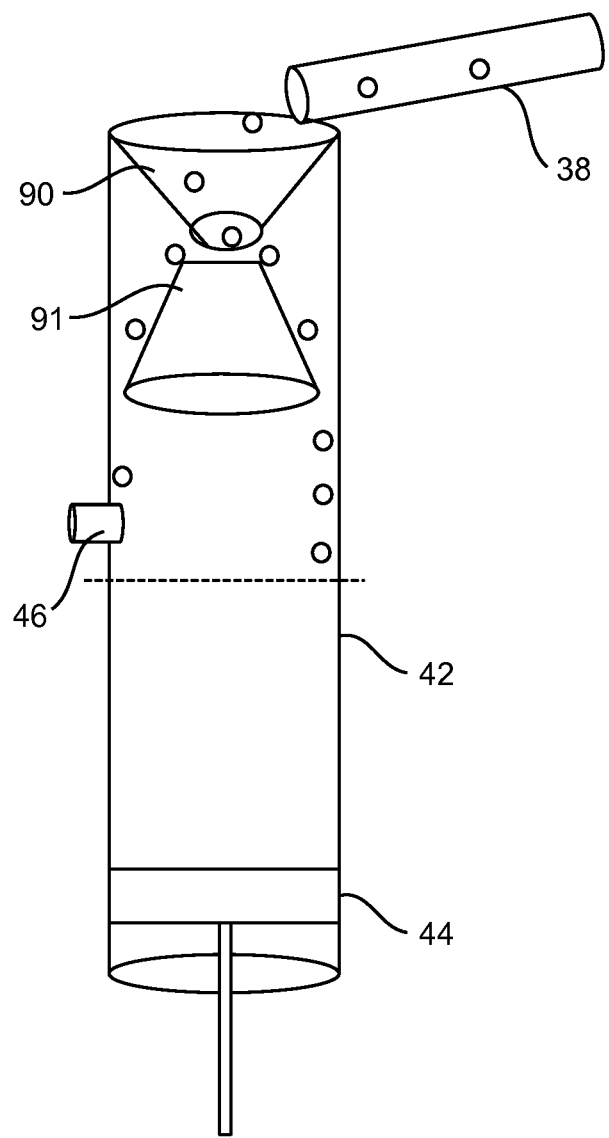
FIG. 6E illustrates a schematic view of an element of an embodiment of the invention.

According to yet another embodiment, the disc element 86 has a diameter smaller than the separation chamber 42, as shown in FIG. 6D. Inlet 41 includes a plurality of holes 83 directed towards the inner surface of separation chamber 42. The distillate exits holes 83 and flows down on the disc element 86 which is adjacent to the inner surface of the separation chamber 42, with a gap between separation chamber 42 and disc element 86. Consequently, the distillate flows down the separation chamber 42 inner wall at one of its ends and the gentle flow effect is achieved in the same manner as in the embodiment above. There are one or more holes 84 in the separation chamber 42 to avoid accumulation of pressure enabling the gentle flow.

In another embodiment, tube 38 discharges the distillate into a funnel element 90 placed on the top portion of separation chamber 42, and placed under the end portion of a tube 38. The distillate falls out of the narrow bottom portion of the funnel element 90 onto a conic element 91 placed under the funnel element by means of a fixing axis. The distillate flows on the back surface of conic element 91. The wide bottom portion of conic element 91 has a diameter just a bit smaller than the diameter of separation chamber 42 such that the distillate can flow downwards on the inner surface of separation chamber 42 through the small gap between the bottom portion of conic element 91 and separation chamber 42 (wherein said gap is in one example approximately 0.3 mm). In another embodiment conic element 91 is replaced with a bell shaped element. This assists the unified slow flow of the distillate and prevents the mixture of the wax and the oil.

Figure 6F:
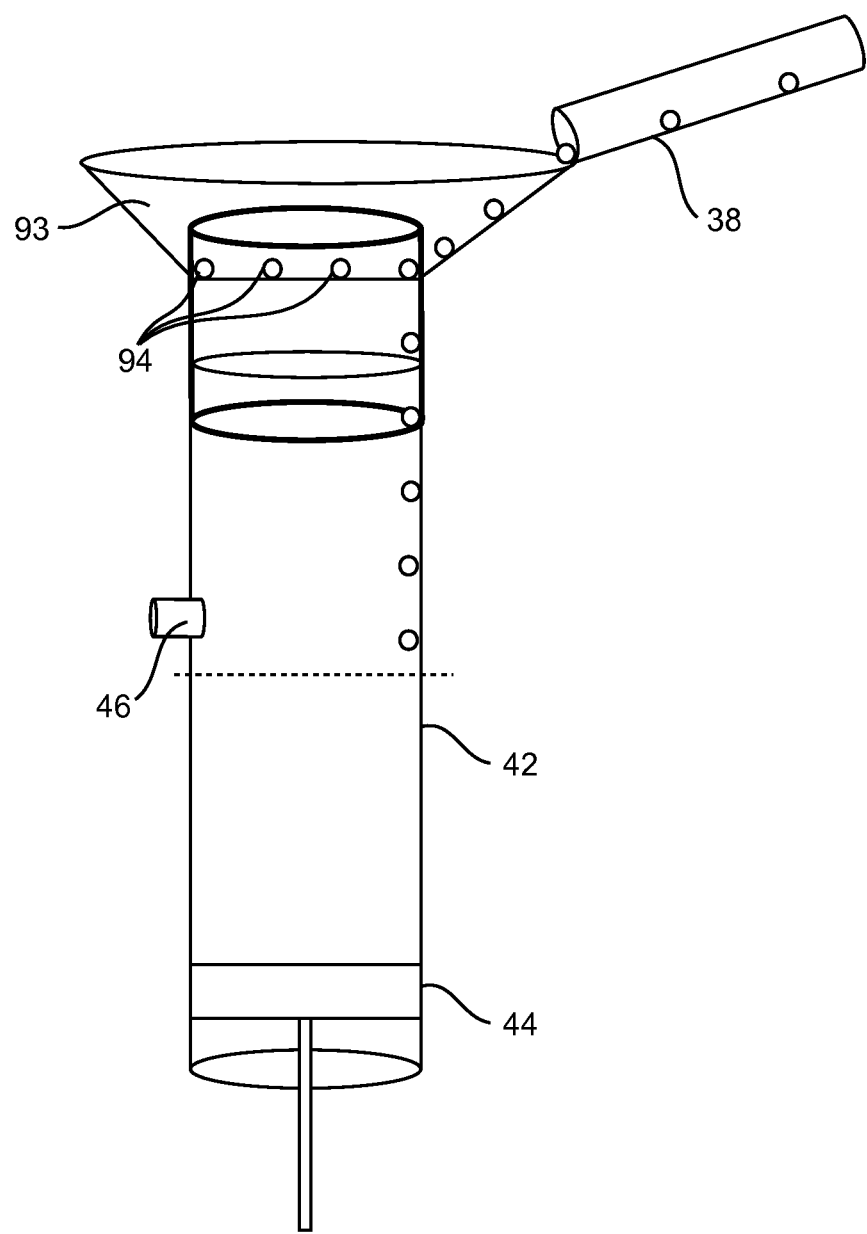
FIG. 6F illustrates a side schematic view of an element of an embodiment of the invention.

In another embodiment, tube 38 discharges the distillate into a funnel element 93, placed under the end portion of a tube 38 and wherein the bottom narrow portion of funnel element 93 is attached (and seals) the outer surface of separation chamber 42. As shown in FIG. 6F, separation chamber 42 includes a plurality of holes 94 in its side walls right above the attachment point with funnel element 93. The distillate accumulates at the bottom narrow portion of funnel element 93 and flows through holes 94 slowly down the inner walls of separation chamber 42, assisting the unified slow flow of the distillate and prevents the mixture of the wax and the oil.

Figure 6G:
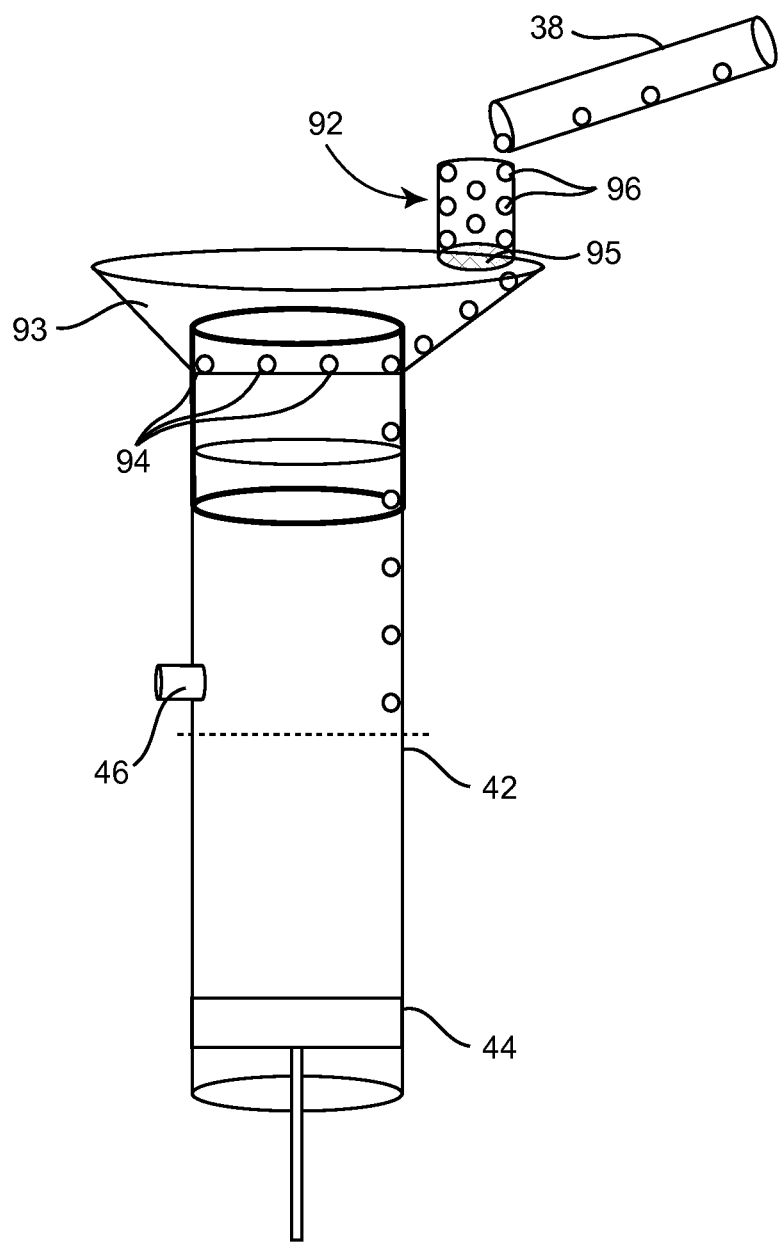
FIG. 6G illustrates a side schematic view of an element according to one embodiment of the present invention.

Optionally, the present invention further includes a filter unit 92, wherein the tube 38 discharges the distillate into the funnel element 93 through said filter unit 92, as shown in FIG. 6G (the filter unit 92 is placed under the end portion of a tube 38). The filter unit 92 includes a plurality of glass balls 96. In one example, each glass ball has a diameter of approximately 2 mm. The glass balls are configured to absorb the plant matter wax on their surface, making for a purer distillate. A net or mesh screen 95 is placed on the bottom of filter unit 92 to keep the balls 96 in the filter unit 92 and prevent the balls 96 from falling out of filter unit 92. In another arrangement, filter cloth is placed on top of the herbs absorbs the waxy materials within the distillate process.

The general diameter of holes 94, 81 and 83 is in one example between 1 mm-3 mm (such as—2 mm). The general diameter of the separation chamber 42, in one example, is between 0.8 cm-1.5 cm (such as—1 cm). The length of separation chamber 42 is in one example between 4 cm-9 cm. The funnel element 90 is, in one example, made of stainless steel or plastic. The upper large portion diameter of funnel element 90 is, in one example, between 0.8 cm-5 cm (such as—1 cm). The lower small portion diameter of funnel element 90 is, in one example, between 0.3 cm-0.7 cm (such as—0.5 cm). The height of funnel element 90 is, in one example, between 0.3 cm-0.7 cm (such as—0.5 cm).

Conic element 91 is in one example made of stainless steel or plastic. As said, the wide bottom portion of conic element 91 has a diameter just a bit smaller than the diameter of separation chamber 42. The upper small portion diameter of conic element 91 is, in one example, between 0.3 cm-0.7 cm (such as 0.5 cm). The height of conic element 90 is, in one example, between 0.3 cm-0.7 cm (such as 0.5 cm).

The large diameter of element 93 is in one specific example between 1.2 cm-2 cm (such as 1.5 cm). The small diameter of element 93 is, in one example, between 0.5 cm-4 cm (such as 1 cm). The general diameter of filter unit 92 is, in one specific example, is between 0.7 cm-1.3 cm (such as 1 cm). The length of filter unit 92 is, in one example, between 2 cm-5 cm (such as 3 cm). Filter unit 92 is, in one example, made of stainless steel or plastic.

Element 86 is, in one example, made of stainless steel or plastic. The general diameter of element 86 is in one example between 8 $mm^{-15}$ mm (such as 9.5 mm).

The diameter of inlet 41 is, in one example, between 0.2 cm-0.6 cm (in one example—0.4 cm). The length of inlet 41 is in one example between 1 cm-5 cm (in one example—3 cm).

Figure 6H:
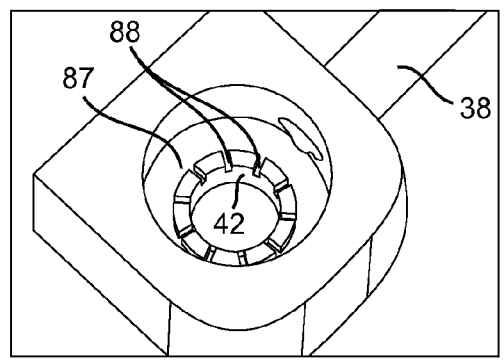
FIG. 6H illustrates a top view of an element of the invention.
Figure 6I:
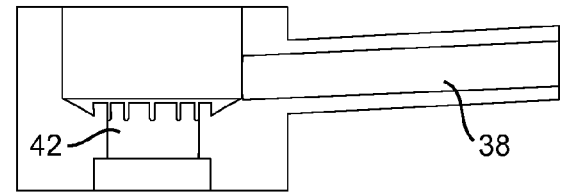
FIG. 6I illustrates an side view of the element provided in FIG. 6H.

As illustrated in FIGS. 6A-6M, the tube 38 is coupled to a round circular channel 87 (surrounding the upper portion of separation chamber 42). The distillate liquid is directed from the tube 38 and accumulates at the round circular channel 87. The liquid passes through slits 88 of the top portion of separation chamber 42, as shown in FIGS. 6H-6I. The liquid further passes through slits 88 to flow down along the inner side of the surrounding wall of chamber 42. According to another configurations of the invention, the distillate liquid directed from the tube 38 passes through a plurality of glass balls 96 (for the reason as explained hereinabove) before entering channel 87, as shown in FIGS. 6K-6M.

Figure 6J:
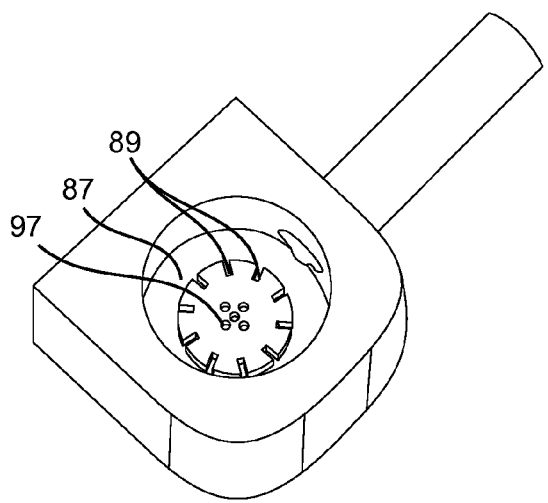
FIG. 6J illustrates an top view of the element provided in FIG. 6H.
Figure 6K:
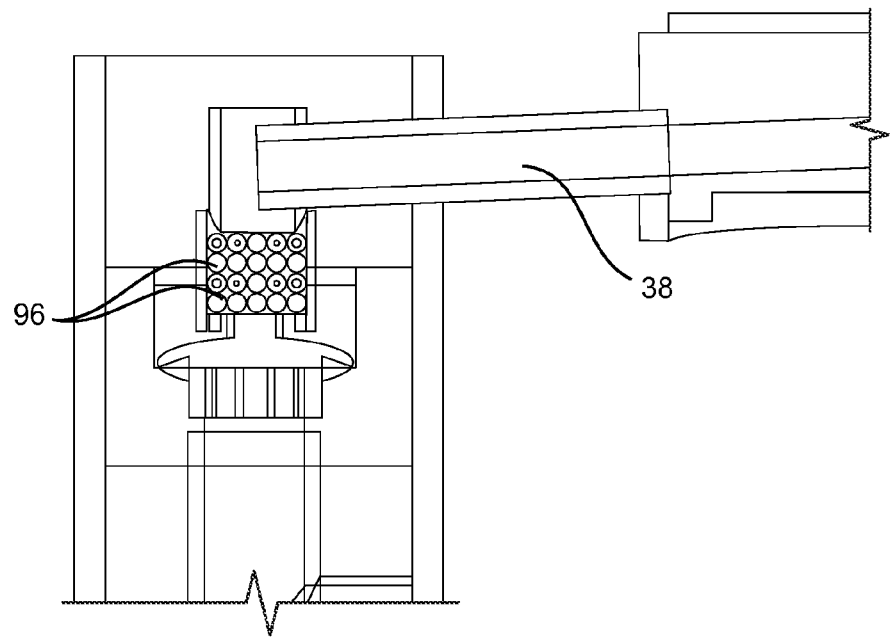
FIG. 6K illustrates a cutaway view of the element provided in FIG. 6H.
Figure 6L:
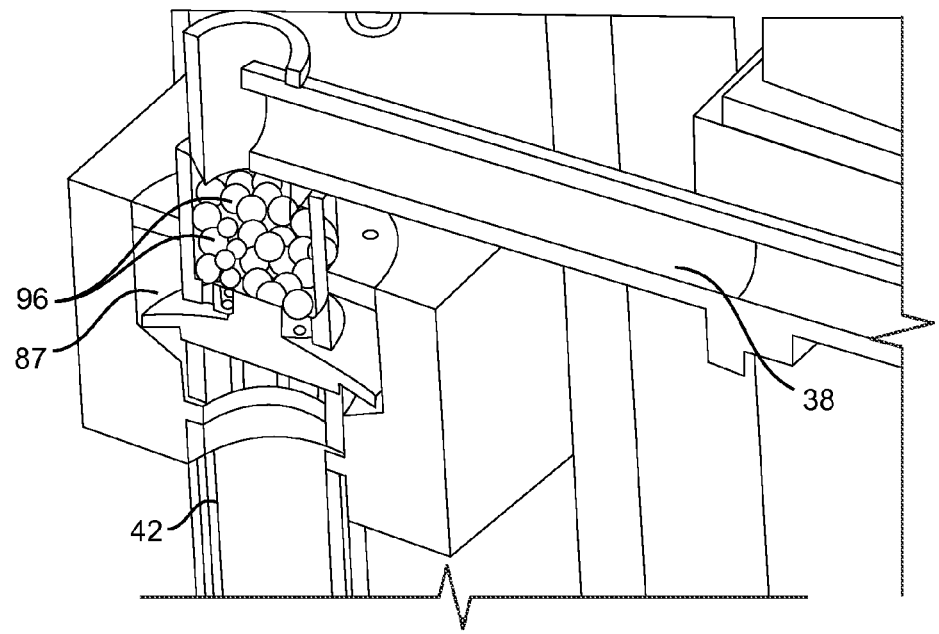
FIG. 6L illustrates an perspective view an element of the invention.
Figure 6M:
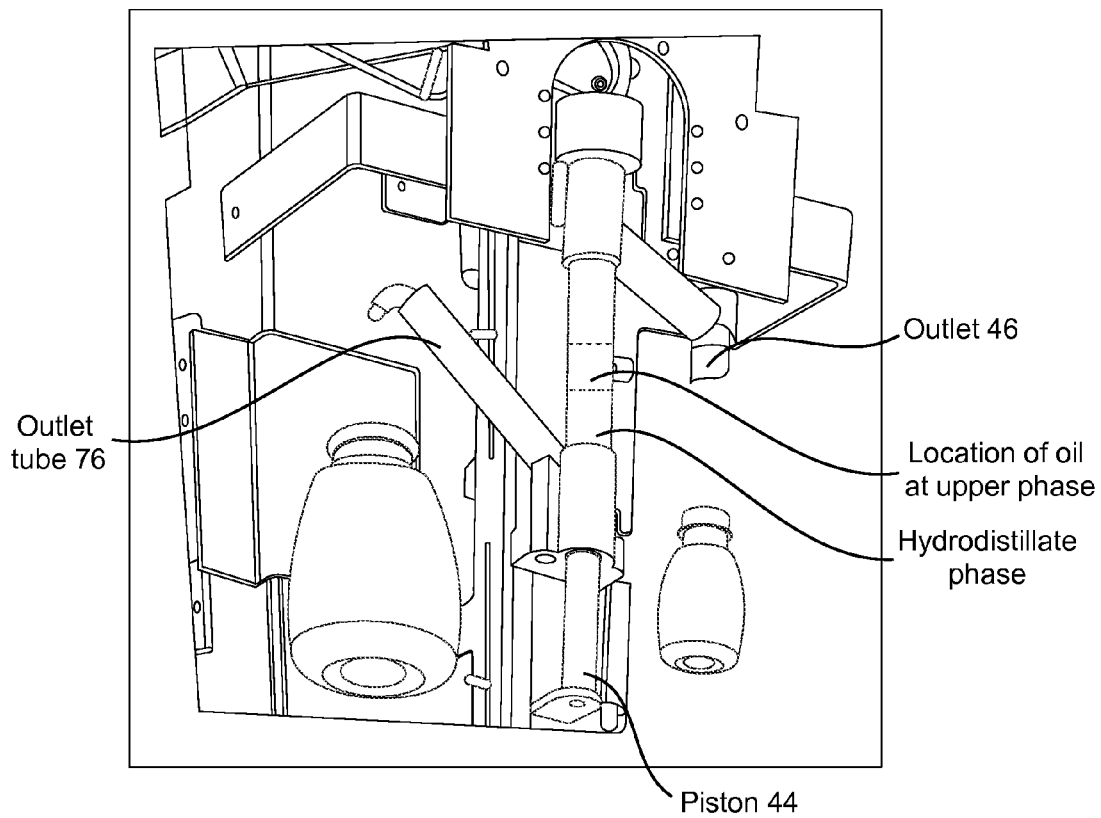
FIG. 6M illustrates a schematic view of an element of an embodiment of the invention.
Figure 7:
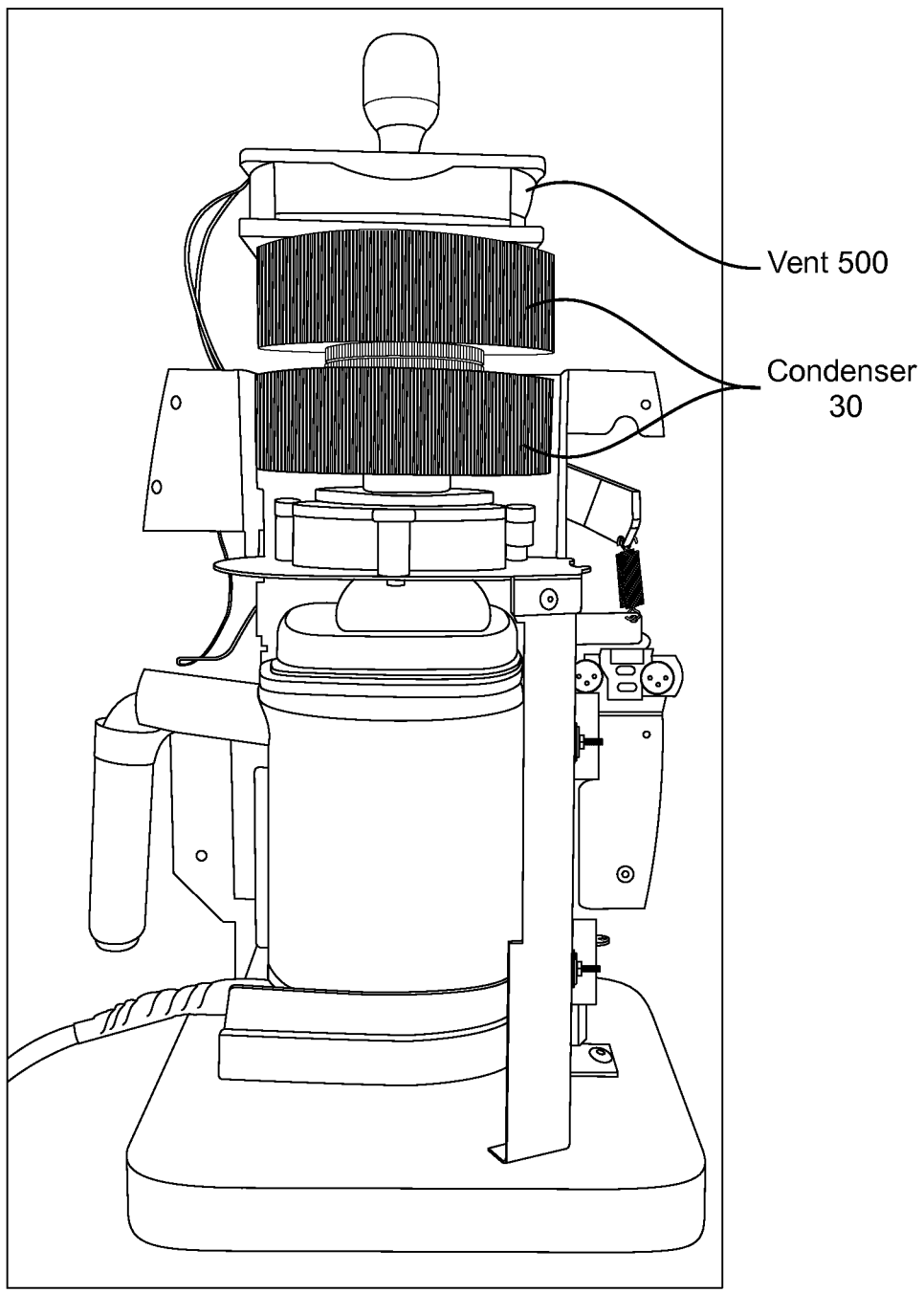
FIG. 7 illustrates a picture of an embodiment of the general apparatus of the present invention. of the present invention.

FIG. 6J illustrates a ball blocking element 97 that keeps the balls from falling into chamber 42 (and also keeps the liquid from flowing directly therein). The liquid passing through balls 96 accumulates at channel 87 and passes through slits 89 and flows down along the inner side of the surrounding wall of chamber 42. The diameter of each ball is in one example approximately 2 mm and the volume of the plurality of balls is in one example approximately 5 cc.

The hydrosol collecting bottle 77 and oil collecting bottle 71 are made of glass or another material that that is the acceptable for long-term storage. The tubes 76, 46 and 38 are in one example comprised of stainless steel or a Teflon® coated material. The piston tube of the separation unit is visible in order to follow the separation process and to confer a unique experience to the apparatus users. Optionally, tube 46 is a onetime disposable tube made of a transparent material optionally with a magnifying glass to view the oil flow in a better manner.

This embodiment is especially useful in view of the oil separation features (electrode, piston, etc.). The oil produced is pure without any water-distillate (hydrosol). Producing oil in this manner prevents the need for additionally cleaning the accumulated oil from hydrosol mixed with it or the like.

The lower small portion diameter of funnel element 90 is in one example between 12 mm-20 mm (such as 16 mm).

The thickness of tube 76 is, in one specific example, between 4 mm-8 mm (such as 6 mm). An example of its length—approximately 8 cm (its four portions are about 1 cm, 4 cm, 2 cm and 0.5 cm respectively).

The diameter of tube 46 is in one example between 3 mm-6 mm (in one example—4 mm). The length of tube 46 is in one example between 1.5 cm-3 cm (in one example—2 cm).

Bottle 77 is in one example made of glass in one example able to contain 100 cc liquid. Its length is, in one example, 8 cm.

Bottle 71 is, in one example, made of brown glass for protection against sunlight, in one example able to contain 2.5 cc liquid. Its length is in one example 3 cm and diameter in one example 1 cm.

According to an alternative embodiment, the apparatus is configured to generate approximately at 80 cc of hydrosol water within 12 minutes of operational time. Within this time, almost all of the aromatic oil is released from the plant matter. A minimal amount (if at all) of plant material wax is released within this time. Furthermore, approximately 3 cc of aromatic oil is produced during this operation time.

Figure 9A:
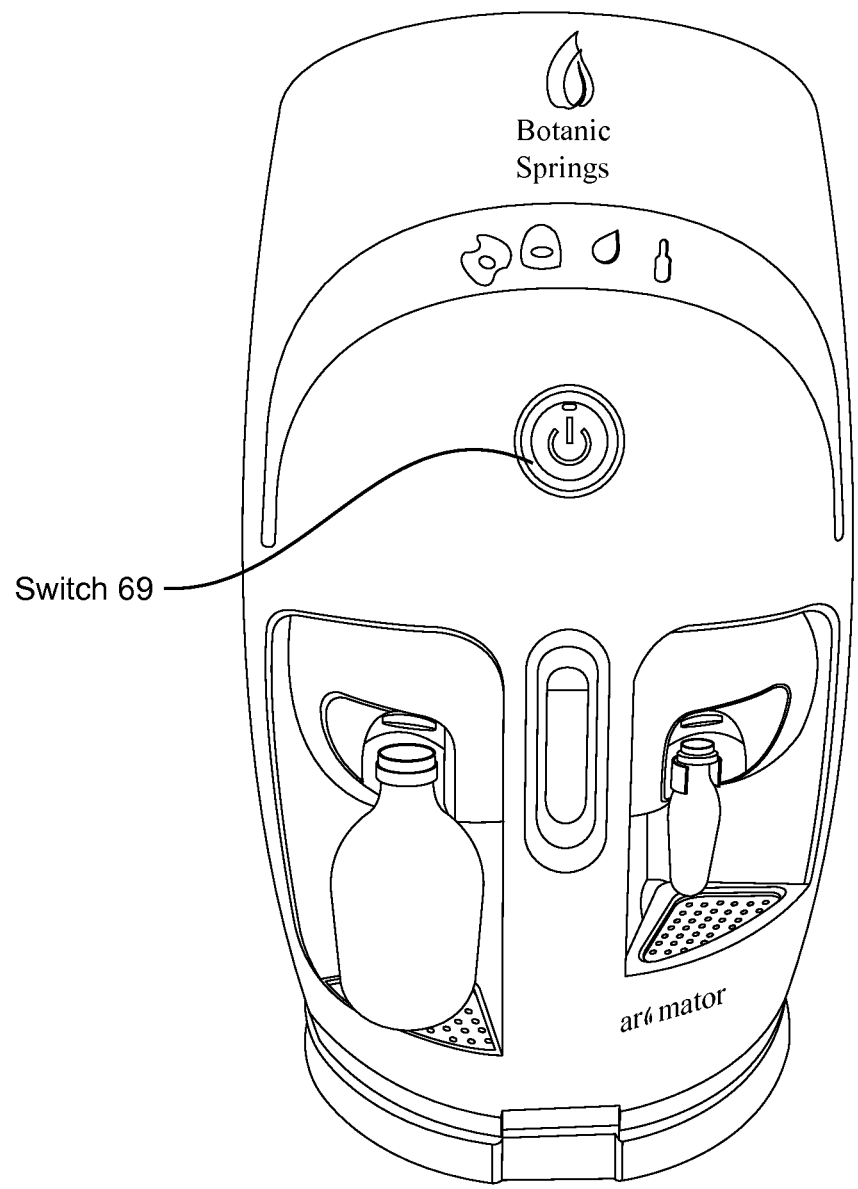
FIG. 9A illustrates the electric elements according to an embodiment of the present invention.
Figure 9B:
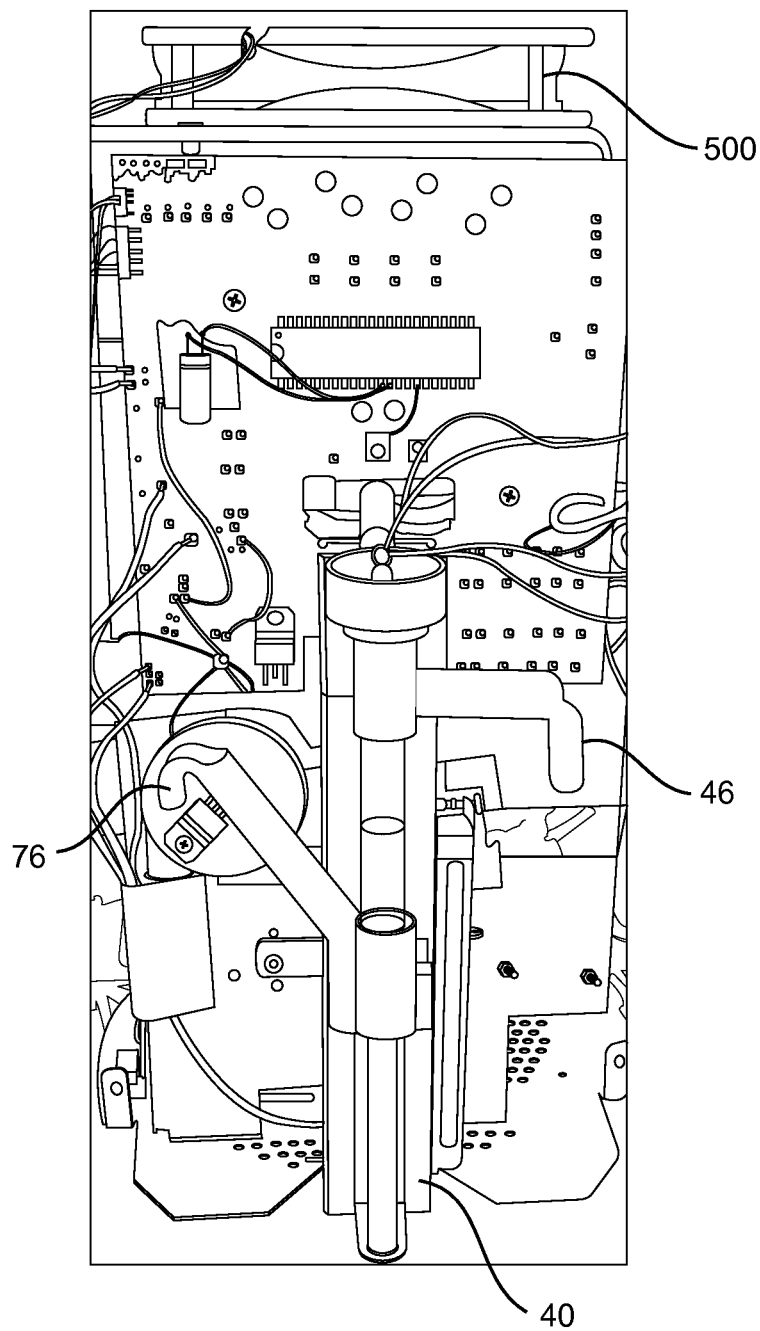
FIG. 9B illustrates the electric elements according to an embodiment of the present invention.

As seen in FIG. 9, the apparatus includes an activation switch 60 connected to the heating unit for the activation of the heating unit. The switch 60 activates a heat regulator that enables regulation of the heating unit to heat at different temperatures. The heating unit is connected to an electric socket via electric plug 61. Electric plug 65 is connected to an electric socket and powers the other electric units of the apparatus, i.e. the condenser fan 36 and the separating unit motor 43. The condenser 30 includes a switch 69 for activating/deactivating fan 36. The apparatus further includes a switch 67 that activates the motor 43 to extract and collect all the oil accumulated in the separation chamber 42 into bottle 71. Piston 44 is placed at a beginning state before operation of the motor (43). Pressing switch 67 causes the motor (43) to drive and move piston 44 until the hydrosol touches the electrode/s as explained herein. Then the motor drives and moves piston 44 back to its beginning state after all the oil has been removed.

In one example, the condenser fan 36 is activated by pressing switch 69. After several minutes of activation, the heating unit is turned off. The condenser fan 36 is then also deactivated. Subsequently, the oil is collected by pressing switch 67.

The apparatus optionally includes a switch that activates and deactivates all the electric elements automatically such that the whole process is executed by pressing that switch once. This would include activation of the heating unit and fan 36 and deactivation, and activating the separation unit motor (as explained herein). This also includes a control unit, a timer, etc. as known in the art. Also, the apparatus includes an indicating unit indicating the end of the process such as a LED that is activated after the oil is collected.

In another arrangement of elements, the device of the present invention provides for an advantageous feature for self-cleaning. In this mode, the heating unit is activated. The steam travels through a used capsule 20 still containing plant matter, or through an empty capsule 20. The steam is directed through inlet 31. The fan 36 is turned off, thus the steam mostly does not turn into water in the condenser chamber 32 but cleans chamber 32 and continues through tube 38 (also cleaning it) to the separation unit. The steam travels though all the tubes/chambers in the separating unit and washes and cleans them. Optionally, the fan is turned on and off interchangeably wherein part of the time steam and part of the time water is passed though the condenser to the separation unit 40. Thus washing and cleaning all the tubes, chambers and passage ways. At the end of the washing process the cleaning water is discharged at liquid collecting tray 78. In another example, an automatic washing switch or button activates the washing process.

Another operational mode of the present invention is directed to distillation of beverages. A capsule of the present invention can be filled with solid organic material desired for distillation, such as coffee and Tea powder. For example, using the described apparatus, the steam mixes with the powder, but the coffee is not volatile and therefore does not exit the capsule with the steam. However, other materials in the coffee are volatile and are extracted with the steam and the liquid obtained (after the condensing) is a transparent liquid with a coffee smell and coffee taste (wherein the liquid includes mainly volatile compounds). In this case, the separation chamber is only used for collecting and dispersing the obtained liquid (and not for separation). Prior Art coffee capsules are used when steam/hot water mixes with the coffee and produces coffee with volatile and mostly non-volatile materials. An advantage of the present invention, for example, is that the caffeine, which is non-volatile under water distillation, is not extracted with the steam. A caffeine free beverage is thus obtained using the present invention. In the alternative, the device is configurable to generate a tea based beverage using the same mechanism used to extract and produce a coffee-based beverage.

In a further arrangement of the present invention, the device described is configured with a water dilution device (not shown). In the provided configuration, the water dilution device is used to produce drinkable water from the concentrated hydrosol.

In a further configuration of the device described, the device is configured with a standard water filter and both a cooling device and a heater for producing beverages generated by diluting the hydro-distillates with cold or hot filtered tap water (according to a specified temperature range). For example, the present device is equipped with a carbon-filter, electric heater and compressor module designed to cool or heat the filtered-water to produce diluted beverages (according to a specified concentration range) of hydro-distillates and other extracts as well and any other compounds derived from the extraction processes. This configuration of the device thus produces chilled or warmed hydrodistillate-based beverages ready to use (such as simple natural drinks and therapy treatments).

The device described is further configurable with an additive cartridge. For example, the described device is configurable such that the water/hydrosol mixture flavored with a flavor, sweetener or other extract stored within the additive cartridge. For example, the described device is equipped to accept pre-sweetened containers of hydrosol concentrate. In this arrangement, the device is coupled to the presweetened cartridge in such a fashion that the recovered water is mixed or combined with the presweetened concentrate contained within the cartridge and the hydrosol. In a further arrangement, the additive cartridge contains suitable elements to render the overall mixture carbonated.

In any of the foregoing, the beverages produced can be secured in a removable storage container. Additionally, the beverage containers are chilled or warmed depending on the desires of the users In yet a further arrangement of elements, the present device is equipped to extract and distil beverage-grade alcohol from any kind of fermented organic material (fermented mostly by yeast) stored in the water container. In this case, an empty capsule should be inserted to the device in order to obtain pure distilled alcohol. In case the users desire to obtain ethanol containing volatile plant compounds, a capsule containing proper plant mater should be used. In one arrangement, the heating element, for example controlled by a thermometer is configurable to hold the temperature fixed during the distillation process, at above the boiling point for distilling a liquid. In one example, ethanol is raised to 78° C. (ethanol boiling point) in order to distil the ethanol from the fermented liquid. In this case, the distilled alcohol is collected in a bottle placed at the hydrosol bottle position. The device, which is equipped with thermometer, enables the removal of traces of methanol (a very toxic alcohol some times also generated by the yeast) by a short pre-distillation process at the temperature range, such as above 64 (i.e. methanol boiling point) and below 78 (ethanol boiling point). Those skilled in the art will appreciate that other liquids can be distilled in the same manner using different configurations of pre-distillation and distillation temperatures.

In a further embodiment, the device is equipped to accept the prepared volatile oils and stored in the additive cartridge port for producing volatile oil ready to use. The volatile oil extracts can be diluted with oil-soluble compounds, such as carrier oil rottenly used in aromatherapy, and prepared compositions are directed to the stored diluted oil container so that a prepared oil of a given composition and concentration is generated and produced by the device in question. In this way the proper mixture and consistency of oils generated by the device are maintained.

In a further embodiment, the device as described in the present invention is equipped to accept the prepared volatile oils and stored in the additive cartridge for producing natural perfume. The volatile oil (or other extracts) can be diluted with carrier alcohol (or other oil-soluble compounds). Perfume and prepared compositions are directed to the stored diluted alcoholic perfume container so that a prepared perfume of a given composition and concentration is generated and produced by the device in question. In this way the proper mixture and consistency of oils generated by the device are maintained.

The foregoing arrangements are provides that the device described is a integrated beverage production facility that is both simple to operate and suitable for domestic use, Furthermore, the invention do described is a suitable replacement for a variety of single function devices with the additional benefit of providing customizable additives and flavorings.

EXAMPLES

The foregoing examples provide specific exemplary descriptions of both the processes of the present invention and specific dimensions of the elements of the apparatus described. Those skilled in the art will appreciate that the foregoing examples are exemplary and other materials, dimensions and procedures can be used.

Example 1

As showing in the forgoing, distilling herbs placed within a capsule yields higher amount of volatile oil than that placed on a grid. The capsule yields volatile oil and hydrosol with higher quality than on a grid, as detected by GCMS method. The left over water in the tank is clear and clean versus utilizing a grid.

The given example, the described apparatus is configured with an outlet tube 6 is, in one example, between 1 cm-2 cm (such as—1.6 cm). The capsule volume is, in one example, between 300 cc-500 cc (such as—400 cc). The capsule bottom diameter is, in one example, between 6 cm-10 cm (such as—8 cm). The capsule height is, in one example, between 4.5 cm-7.5 cm (such as—6 cm). The adapter 7 general diameter is, in one example, between 4.5 cm-7.5 cm (such as—6 cm), and is made of metal or boiling resistant plastic. The general diameter of outlet 26 is, in one example, between 1 cm-2 cm (such as—1.6 cm). The outlet tube 26 length is, in one example, between 0.3 cm-4 cm (such as—0.5 cm). Outlet 26 is, in one example, made of plastic. The diameter of tube 8 is, in one example, between 3 mm-7 mm (such as 5 mm). The length of tube 8 is, in one example, between 3 mm-7 mm (such as—5 mm). Tube 8 is, in one example, made of plastic or stainless steel. The diameter of tube 21 is, in one example, between 2.8 mm-5.2 mm (in one example—4.1 mm). The length of tube 21 is, in one example, between 4.5 mm-7.5 mm (in one example—6 mm). The capsule 20 is optionally transparent (or portions of it transparent) and in one example made of plastic (for example recyclable plastic), and the plant material contained within it can be seen through it. The capsule 20 in one example includes thermal isolated matter, such as plastic, in order to minimize condensation.

In operation, 80 grams of fresh leaves of lavender are put on the grid of the oil extraction apparatus described above. The water is heated in the vessel and steam created passing through the lavender leaves placed on the grid above the boiling water. The steam is condensed in the condenser and the obtained liquid is separated into hydrosol and aromatic oil. After 10 minutes of operation, 100 ml of hydrosol was obtained and 0.7 ml of oil was obtained.

Also, 80 grams of fresh leaves of lavender was put in a capsule of the present invention. The water was heated in the water vessel and steam was created passing through the capsule. The steam was condensed in the condenser and the obtained liquid was separated into hydrosol and aromatic oil in the separating unit. After 10 minutes of operation, 100 ml of hydrosol was obtained and 0.9 ml of oil was obtained.

Figure 10A:
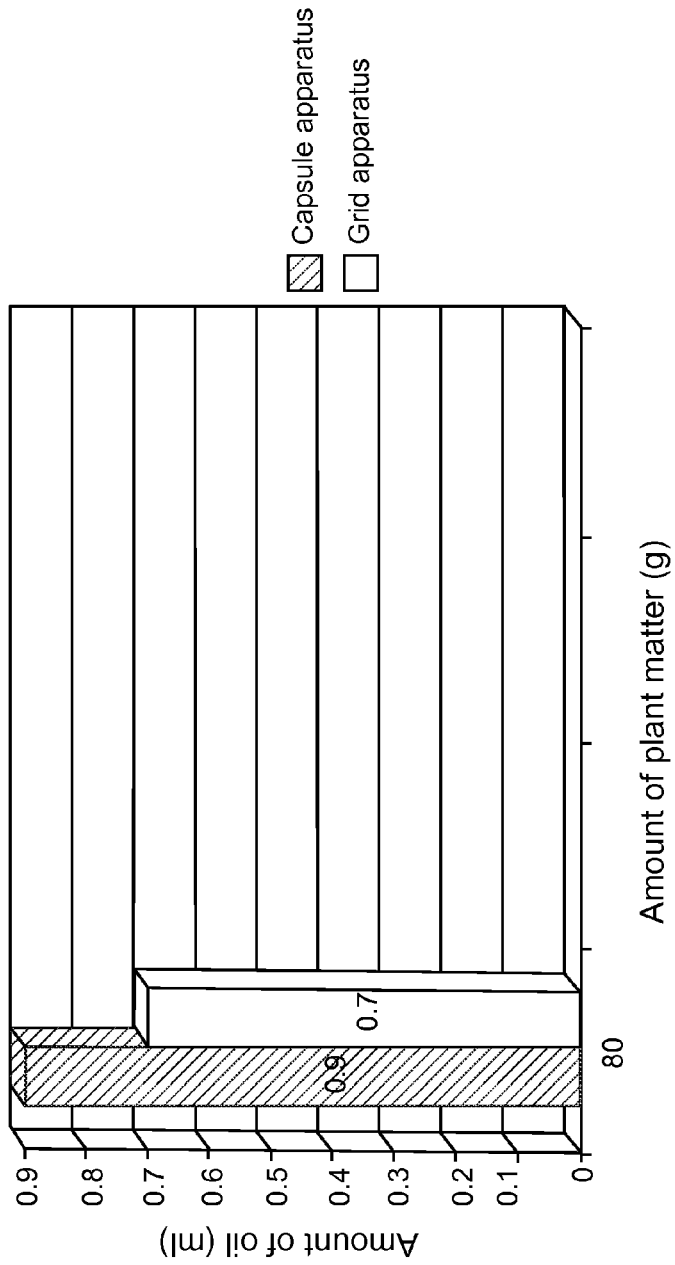
FIG. 10A illustrates a comparison of efficiency between the present invention process and the prior art.

As shown in FIG. 10A, the present invention including the capsule proved to be more efficient by 29%.

Example 2

Using the same apparatus as in Example 1, 120 grams of fresh oroblanco (hybrid of *Citrus paradisi*×*Citrus maxima*) peels were put on the grid of the oil extraction apparatus of described above. The water was heated in the vessel and steam was created passing through the lavender leaves placed on the grid above the boiling water. The steam was condensed in the condenser and the obtained liquid was separated into hydrosol and aromatic oil. After 10 minutes of operation, 100 ml of hydrosol was obtained and 0.8 ml of oil was obtained.

Also, 120 grams of fresh oroblanco peels were put in a capsule of the present invention. The water was heated in the water vessel and steam was created passing through the capsule. The steam was condensed in the condenser and the obtained liquid was separated into hydrosol and aromatic oil in the separating unit. After 10 minutes of operation, 100 ml of hydrosol was obtained and 1.2 ml of oil was obtained.

Figure 10B:
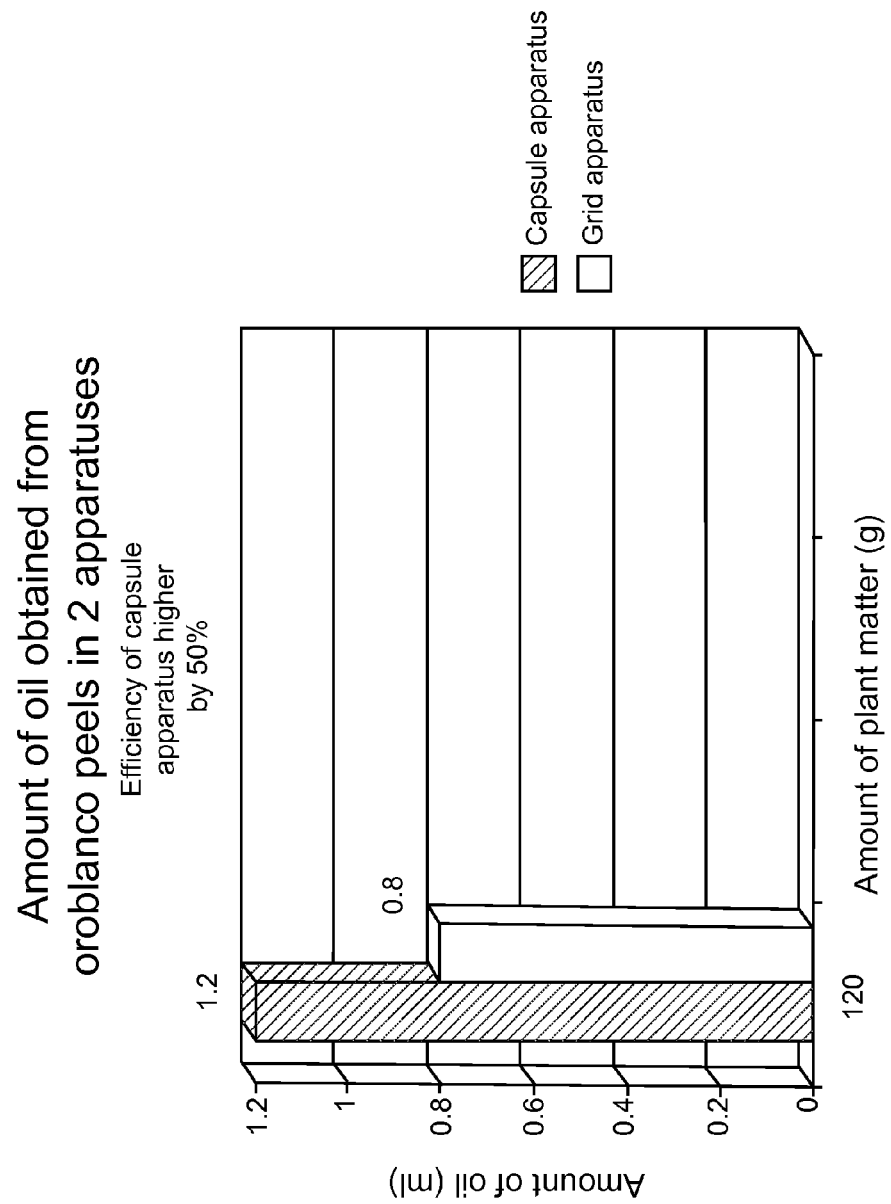
FIG. 10B illustrates a comparison of efficiency between the present invention process and the prior art.
Figure 10C:
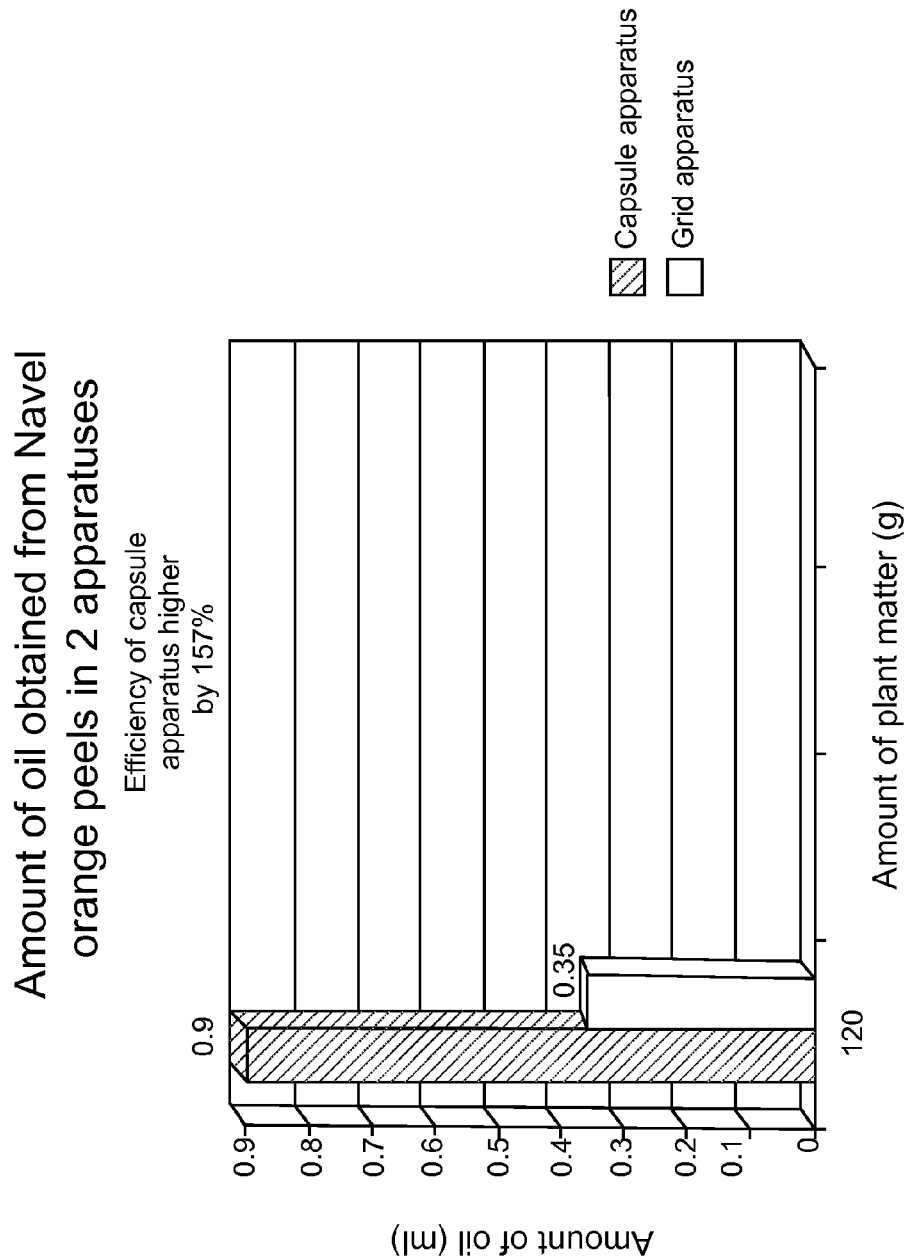
FIG. 10C illustrates a comparison of efficiency between the present invention process and the prior art.

As shown in FIG. 10B, the present invention including the capsule proved to be more efficient by 50%.

Example 3

120 grams of fresh navel orange peels were put on the grid of the oil extraction apparatus of apparatus described above. The water was heated in the vessel and steam was created passing through the lavender leaves placed on the grid above the boiling water. The steam was condensed in the condenser and the obtained liquid was separated into hydrosol and aromatic oil. After 10 minutes of operation, 100 ml of hydrosol was obtained and 0.35 ml of oil was obtained.

Also, 120 grams of fresh navel orange peels was put in a capsule of the present invention. The water was heated in the water vessel and steam was created passing through the capsule. The steam was condensed in the condenser and the obtained liquid was separated into hydrosol and aromatic oil in the separating unit. After 10 minutes of operation, 100 ml of hydrosol was obtained and 0.9 ml of oil was obtained.

As shown in FIG. 10D, the present invention including the capsule proved to be more efficient by 157%.

It should be understood that various combination, alternatives and modifications of the present invention could be devised by those skilled in the art. The present invention is intended to embrace all such alternatives, modifications and variances that fall within the scope of the appended claims.

It will also be understood that while the specification discusses the liquid as being water, other liquids are possible for use so long as the teachings of the present invention are realized.

While the invention has been particularly shown and described with reference to a preferred embodiment thereof, it will be understood by those skilled in the art that various changes in form and details may be made therein without departing from the spirit and scope of the invention.

Example 4

| | Distilling of Dried Leaves | | |
|---|---|---|---|
| Container type | herb amount (gr.) | hydrosol volume (ml) | oil yield (ml) |
| Capsule | 60 | 150 | 2.0 |
| Grid | 60 | 150 | 1.4 |
| Grid | 180 | 150 | 6.0 |

Conclusions:

Distilling of lavender in small amount (about 60 gr.) within a capsule yields 33% higher oil quantity then on a grid.

When using large amount (about 180 gr.) of herbs (lavender), no detectable difference in the oil yield was observed if a capsule or a grid is used.

Example 5

Distilling of sweet marjoram (*Origanum majorana*) fresh branches placed within a capsule or laid on a grid.

TABLE 5B

| container type | distillate type | % cis-sabinene hyrtate | % tras-sabinene hydrate |
|---|---|---|---|
| capsule | oil | 23.12 | 8.67 |
| grid | oil | 0.0 | 0.0 |

Conclusions:

1—The two isomers of 'sabinene hydrate' molecules (cis and trans) are considered as very sensitive compounds to degradation (by dehydration), and thus marjoram was utilized to determine the distillation process quality.

2—The above results clearly show that the process with a capsule is retained both isomers and prevents their degradation, versus full degradation occurred when the plant mater laid on a grid.

3—No detectable amounts of both isomers are found within the hydrosols obtained by using neither a capsule nor a grid.

What is claimed:

1. A distillation apparatus for extracting volatile oils and hydrodistillate from organic matter, the apparatus including:
   a vessel for containing a liquid, the vessel having at least one outlet port;
   a heating unit configured to heat the liquid and generate a vapor;
   a detachable material container for holding the plant matter and having an at least one inlet port and at least one outlet port, the inlet port of the detachable material container being removably coupled to the at least one outlet port of the vessel to receive the vapor and allow contact between the vapor and the plant matter so as to produce an infused vapor, wherein the detachable material container includes:
      a peripheral liquid collecting channel portion which surrounds the inlet port and is formed along a peripheral edge of a bottom floor of the detachable material container; and
      a plurality of step-sector elements integral to the bottom floor of the detachable material container and elevated therefrom, wherein each step-sector element includes a plurality of holes passing through a top surface of the step-sector elements and at least one side surface thereof;
   a condenser removably coupled to at least one outlet port of the material container, and configured to cool the infused vapor to a condensation point so as produce a condensed liquid; and
   a separating unit in fluid communication with the condenser to separate and remove the volatile oils and hydrodistillates from the condensed liquid.

2. The material container according to claim 1, wherein the container further includes a base element that is disposed beneath the bottom floor and includes a plurality of track-like sector elements formed as a part thereof, the track-like sector elements corresponding to and being placed under the step-sector elements.

3. The material container according to claim 1, wherein sides of the container are slanted and the bottom floor of the container is slanted.

4. The material container according to claim 1, wherein the container is configured with a rounded dome shaped top portion.

5. The distillation apparatus of claim 1, wherein the separating unit further includes:
   a separation chamber that is in fluid communication with the condenser and receives the condensed liquid, the separation chamber including an upper outlet and a lower outlet,
   a motor,
   a piston driven by the motor within the separation chamber, wherein a head portion of the piston intimately contacts an inner wall of the separation chamber for preventing leakage of the condensed liquid from its sides;
   a sensor disposed within the separation chamber proximate to a bottom edge of the upper outlet and being configured to differentiate between the volatile oils and hydrodestillates conductivity; and
   a circuit controlled valve connected to the lower outlet and configured to be controlled in response to an output signal generated by the sensor.

6. The distillation apparatus according to claim 5, wherein the separating unit further includes a tubular member inlet comprising a plurality of holes formed along a side thereof; and wherein the separation chamber further includes a disc shaped element connected to the bottom end portion of the inlet wherein said disc shaped element is adjacent to the inner surface of the separation chamber.

7. The distillation apparatus according to claim 6, wherein the disc element includes a diameter slightly smaller than a diameter of the separation chamber.

8. The distillation apparatus according to claim 6, wherein the separation chamber further includes a funnel element placed under an end portion of a tube, and a conic element disposed under the funnel element.

9. The distillation apparatus according to claim 6, wherein the separating unit further comprises a funnel element placed under an end portion of a tube, wherein a bottom narrow portion of the funnel element is attached to an outer surface of the separation chamber; and wherein the separation chamber includes a plurality of holes in its side walls right above the attachment point with said funnel element.

10. The distillation apparatus according to claim 6, wherein the separating unit further comprises a filter unit disposed under an end portion of the tubular member inlet, the filter unit includes a plurality of glass balls and a net placed on the bottom of the filter unit.

11. The distillation apparatus according to claim 6, wherein the separating unit further comprises a tube coupled to a circular channel surrounding the upper portion of the separation chamber, wherein the top portion of said separation chamber includes slits.

12. The distillation apparatus according to claim 6, wherein the separating unit further comprises a tube placed above a plurality of glass balls placed above a blocking element comprising slits, the blocking element being disposed above the separation chamber.

13. The distillation apparatus according to claim 1, wherein the condenser further includes:
an inner chamber; a plurality of wings which extend from an outer wall of the chamber and a fan placed on a top portion of the condenser.

14. The distillation apparatus according to claim 13, wherein the condenser further includes a cylindrical covering outer wall which covers the condenser lengthwise covering the wings.

15. The distillation apparatus according to claim 13, wherein a bottom floor of the inner chamber is slanted and an outlet is placed at the bottom edge of the floor.

16. The distillation apparatus according to claim 15, wherein the bottom floor of the inner chamber is round and slanted inwardly,
the inner chamber floor including a circular channel portion located at the floor center, wherein the channel portion is slanted and an outlet is placed at a lowest point of said channel portion.

17. The distillation apparatus according to claim 15, wherein a ceiling of the inner chamber is slanted.

18. The distillation apparatus according to claim 15, wherein the ceiling of the inner chamber has a shaped selected from a cone shape and a dome shape.

19. The distillation apparatus according to claim 1, wherein the heating unit is placed on a bottom portion of the vessel.

20. The distillation apparatus according to claim 1, comprising a main structure which includes the heating unit, the condenser and the separating unit;
and wherein the container is placed on a base element which is placed on top of the vessel thus forming a removable jug-like structure fit to be inserted into a main chamber within the main structure;
and wherein the heating unit positioned relative to a bottom surface of the main chamber.

21. The distillation apparatus according to claim 20, wherein the heating unit is placed above the bottom surface of the main chamber.

22. The distillation apparatus according to claim 20, wherein the heating unit is placed beneath the bottom surface of the main chamber.

23. The distillation apparatus according to claim 1, wherein the liquid is water.

24. The distillation apparatus according to claim 1, wherein the separation chamber is configured to removably accept at least one additive cartridge.

25. The distillation apparatus according to claim 24, wherein additive cartridge contains one or more non-toxic organic substances.

26. The distillation apparatus according to claim 1, wherein the condenser comprises a single condenser having a length less than 10 cm, the condenser connected to the separation unit by a pipe having a diameter of less than 9 mm, the pipe having a length of not more than 10 cm.

* * * * *